(12) United States Patent
Bruce et al.

(10) Patent No.: US 12,518,471 B2
(45) Date of Patent: Jan. 6, 2026

(54) GRAPHICS PROCESSING

(71) Applicant: Arm Limited, Cambridge (GB)

(72) Inventors: Richard Edward Bruce, Great Shelford (GB); William Robert Stoye, Cambridge (GB); Jakob Axel Fries, Lund (SE); Wing-Tsi Henry Wong, Lund (SE)

(73) Assignee: Arm Limited, Cambridge (GB)

( * ) Notice: Subject to any disclaimer, the term of this patent is extended or adjusted under 35 U.S.C. 154(b) by 119 days.

(21) Appl. No.: 18/616,469

(22) Filed: Mar. 26, 2024

(65) Prior Publication Data

US 2024/0371075 A1    Nov. 7, 2024

(30) Foreign Application Priority Data

May 3, 2023 (GB) ........................... 2306548
May 3, 2023 (GB) ........................... 2306555
May 3, 2023 (GB) ........................... 2306556

(51) Int. Cl.
*G06T 15/06*    (2011.01)
*G06T 1/20*    (2006.01)
*G06T 15/00*    (2011.01)

(52) U.S. Cl.
CPC ............... *G06T 15/06* (2013.01); *G06T 1/20* (2013.01); *G06T 15/005* (2013.01); *G06T 2210/21* (2013.01)

(58) Field of Classification Search
CPC ......... G06T 15/06; G06T 1/20; G06T 17/005; G06T 15/005; G06T 17/10; G06T 2210/21; G06T 2200/28; G06T 2210/12; G06F 12/0811; G06F 16/9027; G06F 16/901

See application file for complete search history.

(56) References Cited

U.S. PATENT DOCUMENTS

2021/0090319 A1* 3/2021 Muthler ................ G06T 15/005
2021/0304489 A1    9/2021 Saeed et al.
2022/0130097 A1    4/2022 Surti et al.
(Continued)

FOREIGN PATENT DOCUMENTS

GB    2597822 A    2/2022
GB    2609425 A    2/2023

OTHER PUBLICATIONS

Combined Search and Examination Report under Sections 17 and 18(3) dated Nov. 24, 2023, GB Patent Application No. 2306548.5, pp. 1-6.
(Continued)

*Primary Examiner* — Hau H Nguyen
(74) *Attorney, Agent, or Firm* — Pearl Cohen Zedek Latzer Baratz LLP

(57) ABSTRACT

A method of operating a graphics processor to perform ray tracing. The graphics processor includes a ray tracing circuit that can be messaged by the graphics processor's programmable execution unit during execution of a program to perform a respective traversal of the at least one ray tracing acceleration data structure to be traversed for that ray. The ray tracing circuit may need to stop a ray's traversal to return the ray's processing to the programmable execution unit before the ray's traversal is subsequently restarted. In that case, the ray's traversal is restarted from the beginning.

20 Claims, 16 Drawing Sheets

(56) References Cited

U.S. PATENT DOCUMENTS

2023/0126531 A1    4/2023    Croxford et al.
2024/0203031 A1*    6/2024    Cerny .................... G06T 15/06

OTHER PUBLICATIONS

Search Report under Section 17 dated Nov. 30, 2023, GB Patent Application No. 2306556.8, pp. 1-4.
International Search Report and Written Opinion dated Jul. 12, 2024, International Application No. PCT/GB2024/050809, pp. 1-13.
Bruce, R.E., et al., "Graphics Processing", U.S. Appl. No. 18/616,496, filed Mar. 26, 2024.
Combined Search and Examination Report under Sections 17 and 18(3) dated Nov. 23, 2023, GB Patent Application No. 2306555.0, pp. 1-6.
Notice of Allowance dated Oct. 15, 2025, U.S. Appl. No. 18/616,496, filed Mar. 26, 2024.

* cited by examiner

GRAPHICS PROCESSING

BACKGROUND

The technology described herein relates to graphics processing systems, and in particular to the operation of a graphics processor when using a "ray tracing" rendering process (e.g. for the rendering of frames (images) for display).

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value, e.g., the appearance (colour) of the sampling position in the image, is determined based on the object(s) in the scene intersected by the ray passing through the sampling position, and the properties of the surfaces of those objects. The ray tracing calculation is complex, and involves determining, for each sampling position, a set of objects within the scene which a ray passing through the sampling position intersects.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation.

The Applicants believe that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which.

Like reference numerals are used for like elements in the Figures where appropriate.

DETAILED DESCRIPTION

Figure 1:
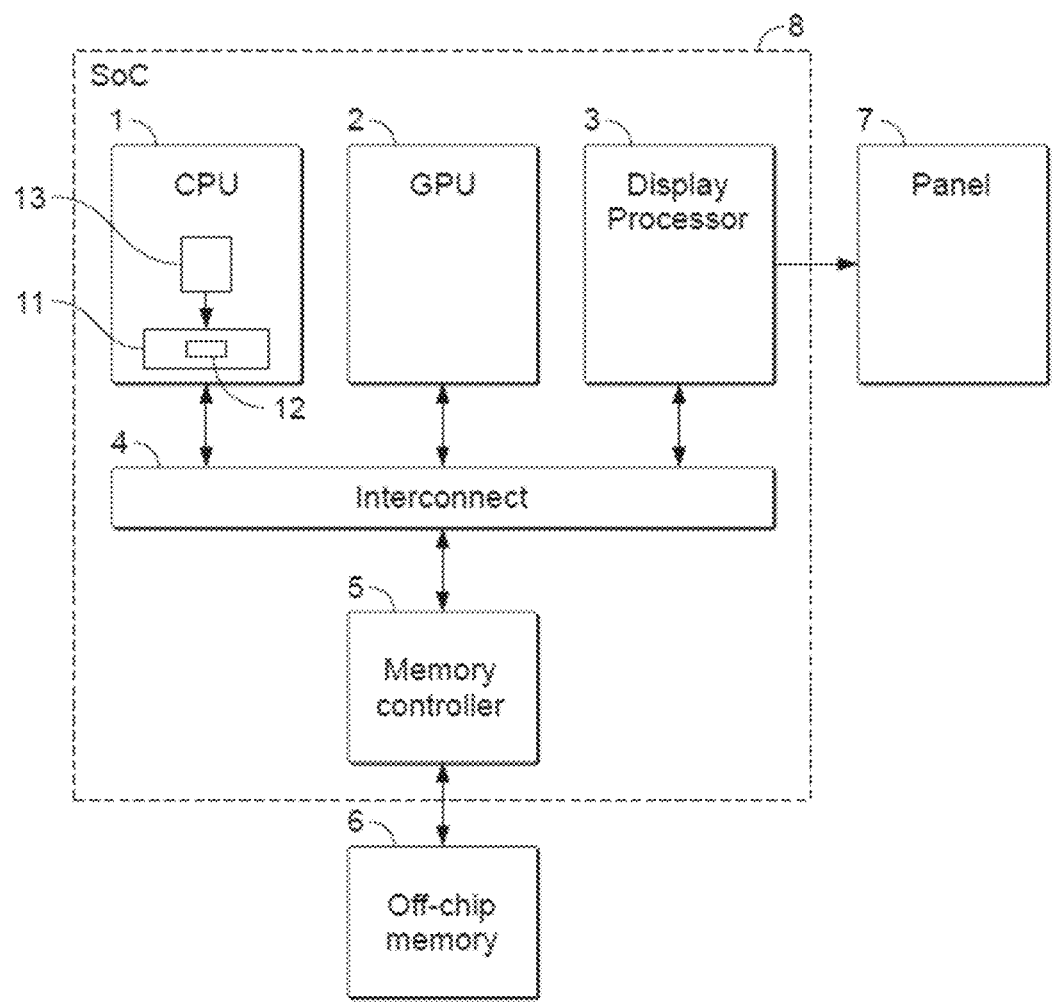
FIG. 1 shows an exemplary graphics processing system.

A first embodiment of the technology described herein comprises a method of operating a graphics processor to generate a render output by performing a ray tracing process in which plural rays are traced through a scene to be rendered, wherein the ray tracing process uses one or more ray tracing acceleration data structures indicative of the distribution of geometry within the scene to be rendered to determine which geometry is intersected by the rays being used for the ray tracing process, and wherein the ray tracing process for a ray involves performing a traversal of at least one ray tracing acceleration data structure to determine geometry that is intersected or potentially intersected by the ray, the traversal for a particular ray starting from a respective start point of a first ray tracing acceleration data structure to be traversed for that ray, the graphics processor comprising a programmable execution unit operable to execute graphics processing programs, and in which programs can be executed by groups of one or more execution threads, the graphics processor also comprising a ray tracing circuit (unit) that can be messaged by the programmable execution unit during execution of a program to perform ray tracing to perform, for a ray for which the program was being executed, a respective traversal of the at least one ray tracing acceleration data structure to be traversed for that ray, the method comprising:

for a ray for which the ray tracing circuit (unit) is performing a respective traversal:

when the ray tracing circuit (unit) determines with reference to the ray tracing acceleration data structure that is currently being traversed that the ray intersects or potentially intersects geometry that requires a shader program routine to be executed before the traversal can continue:

the ray tracing circuit (unit) stopping the traversal at that point and subsequently returning the processing of the ray to the programmable execution unit for execution of the required shader program routine, such that the ray's processing is returned to the programmable execution unit before the ray's traversal of the at least one ray tracing acceleration data structure to be traversed for that ray is completed;

the method further comprising:

the programmable execution unit executing the required shader program routine and subsequently returning the processing of the ray to the ray tracing circuit (unit) to restart the ray's traversal of the at least one ray tracing acceleration data structure to be traversed for that ray; and the ray tracing circuit (unit) then restarting the ray's traversal of the at least one ray tracing acceleration data structure to be traversed for that ray, wherein when the ray tracing circuit (unit) restarts the ray's traversal the traversal is performed from the beginning, starting from the respective start point of the first ray tracing acceleration data structure to be traversed for that ray.

A second embodiment comprises a graphics processor that is operable to generate a render output by performing a ray tracing process in which plural rays are traced through a scene to be rendered, wherein the ray tracing process uses one or more ray tracing acceleration data structures indicative of the distribution of geometry within the scene to be rendered to determine which geometry is intersected by the rays being used for the ray tracing process, and wherein the ray tracing process for a ray involves performing a traversal of at least one ray tracing acceleration data structure to determine geometry that is intersected or potentially intersected by the ray, the traversal for a particular ray starting from a respective start point of a first ray tracing acceleration data structure to be traversed for that ray, the graphics processor comprising a programmable execution unit operable to execute graphics processing programs, and in which programs can be executed by groups of one or more execution threads, the graphics processor also comprising a ray tracing circuit (unit) that can be messaged by the programmable execution unit during execution of a program to perform ray tracing to perform, for a ray for which the program was being executed, a respective traversal of the at least one ray tracing acceleration data structure to be traversed for that ray, the graphics processor being configured such that:

for a ray for which the ray tracing circuit (unit) is performing a respective traversal:

when the ray tracing circuit (unit) determines with reference to the ray tracing acceleration data structure that is currently being traversed that the ray intersects or potentially intersects geometry that requires a shader program routine to be executed before the traversal can continue:

the ray tracing circuit (unit) is configured to stop the traversal at that point and subsequently return the processing of the ray to the programmable execution unit for execution of the required shader program routine, such that the ray's processing is returned to the programmable execution unit before the ray's traversal of the at least one ray tracing acceleration data structure to be traversed for that ray is completed;

the programmable execution unit is configured to then execute the required shader program routine and subsequently return the processing of the ray to the ray tracing circuit (unit) to restart the ray's traversal of the at least one ray tracing acceleration data structure to be traversed for that ray; and the ray tracing circuit (unit) is configured to then restart the ray's traversal of the at least one ray tracing acceleration data structure to be traversed for that ray, wherein when the ray tracing circuit (unit) restarts the ray's traversal the traversal is performed from the beginning, starting from the respective start point of the first ray tracing acceleration data structure to be traversed for that ray.

The technology described herein relates to the performing of ray tracing on a graphics processor to generate a desired render output, for example in order to render a frame that represents a view of a particular scene. In particular, the technology described herein provides a more efficient operation of a graphics processor when performing ray tracing. This is achieved, as will be explained further below, by providing the graphics processor with a ray tracing circuit (unit) which can, and is, used by the graphics processor as an accelerator for ray tracing operations, wherein the graphics processor programmable execution unit when executing a program to perform ray tracing is configured to, and operable to, send messages to the ray tracing circuit (unit) to perform, for a ray for which the program was being executed, a respective traversal of the at least one ray tracing acceleration data structure to be traversed for that ray to thereby determine which geometry, if any, is intersected or potentially intersected by the ray. The ray tracing circuit (unit) then manages and performs the traversals of the acceleration data structure or structures that need to be traversed by the ray accordingly, and can then return the rays to the programmable execution for further processing, e.g. in dependence on the geometry, if any, that is determined to be intersected or potentially intersected by the rays in question.

For instance, the ray tracing process in general involves tracing plural rays through the scene to be rendered in order to determine the respective output values that the sampling positions within the render output should have (e.g. the appearance (e.g. colour) that the sampling positions should have within a frame being rendered), which output values are determined based on the intersections of the rays with the geometry that is defined within the scene (e.g. the geometrical representations of the objects within the scene). Thus, when performing a ray tracing operation, for each ray that is being used to render a sampling position in the output (e.g. frame) that is being rendered, in order to render the sampling position, it first needs to be determined which geometry that is defined for the scene is intersected by the ray (if any) (and then once it has been determined which geometry is intersected, the sampling positions in the rendered output (frame) representation of the scene can be (and are) rendered accordingly).

There are various ways that the determination of which geometry in the scene to be rendered is intersected by which of the rays being used for the ray tracing process can be done, as desired. However, in general, there may be many millions of graphics primitives within a given scene, and millions of rays to be tested, such that it is not normally practical to test every ray against each and every graphics primitive. To speed up the ray tracing operation the technology described herein therefore uses one or more ray tracing acceleration data structures to represent the distribution of the geometry in the scene that is to be rendered to accelerate the determination of which geometry in the scene being rendered, if any, is intersected by a given ray that is being used for the ray tracing process.

The ray tracing acceleration data structure or structures used in the technology described herein can in an embodiment be (and are) traversed to a respective "end point" of the ray tracing acceleration data structure or structures that has geometry associated with it (although an "end point" of a given ray tracing acceleration data structure could also, for example, lead to another ray tracing acceleration data structure). Thus, the determination of the geometry that is intersected by a given ray thus comprises performing a respective traversal of the ray tracing acceleration data structure or structures to be traversed for that ray to determine which, if any, of the "end points" of the ray tracing acceleration data structure represent geometry that is intersected by the ray.

For example, and in an embodiment, the ray tracing acceleration data structure or structures used in the technology described herein generally comprise a plurality of nodes, each node associated with a respective volume within the scene, with the respective volumes encompassing at least some of the geometry that is defined within the scene to be rendered. A given ray tracing acceleration data structure will typically (and in an embodiment) comprise a number of internal nodes, whose volumes in an embodiment encompass the respective volumes of one or more other ("child") nodes within the same ray tracing acceleration data structure, and thus lead to other nodes within the same ray tracing acceleration data structure.

The ray tracing acceleration data structure will also typically (and in an embodiment) comprise a number of end nodes (e.g. 'leaf' nodes in the case of a BVH tree structure). The end nodes may (and at least some end nodes for at least one of the ray tracing acceleration data structures will) represent respective sets of geometry encompassed by the respective volumes associated with those end nodes. That is, the end nodes may be associated with a bounding volume that is drawn around a respective set of geometry, the bounding volume associated with an end node thus representing the lowest level of volume subdivision within the scene, such that if it is determined that the ray intersects the volume associated with a respective end node along a particular branch of the ray tracing acceleration data structure, there are no further (child) node volumes to be tested along that branch of the ray tracing acceleration data structure, and the ray should thus be tested against the units of geometry represented by the end node in question.

However, it is also possible that, rather than directly representing a set of geometry, an end node of a ray tracing acceleration data structure may instead point to another ray tracing acceleration data structure representing a further distribution of geometry. Thus, in that case, if it is determined that the ray intersects the volume associated with such end node, the ray should then proceed to traverse the other ray tracing acceleration data structure that is represented by the end node in question, e.g. to determine with reference to the end nodes of the other ray tracing acceleration data structure which geometry, if any, is intersected.

For example, and in an embodiment, the ray tracing acceleration data structure or structures comprise a nested set of bounding volume hierarchy (BVH) tree structures, with a respective 'top level' BVH tree structure representing the distribution of geometry at a relatively coarser level, and with at least some end nodes of the top level BVH tree structure pointing to further ('bottom level') BVH tree structures that represent the distribution of geometry at a relatively finer level. The traversal may thus, and in some embodiments do, proceed over multiple different ray tracing acceleration data structures representing different levels of subdivision of the scene to be rendered. In that case, at least the end nodes of the ray tracing acceleration data structures at the lowest level of subdivision should represent actual geometry that is encompassed by the respective volumes of those end nodes.

A respective end node for a given ray tracing acceleration data structure may in general thus represent geometry (e.g. a set of primitives) that is encompassed by the respective volume associated with the end node but may also point to another ray tracing acceleration data structure to be traversed, e.g. representing the distribution of geometry within the respective volume associated with the end node. In this respect it will be appreciated that it may be the case that all of the end nodes of a particular ray tracing acceleration data structure represent geometry or all point to further ray tracing acceleration data structures to be traversed (i.e. the end nodes are all of the same 'type'), but it may also be the case (and often will be the case) that the end nodes for a given ray tracing acceleration data structure comprise a mixture of end nodes representing geometry and end nodes that point to further ray tracing acceleration data structures to be traversed.

Thus, the at least one ray tracing acceleration data structure whose end nodes represent geometry may in some cases be the first (and may in some embodiments be the only) ray tracing acceleration data structure that is used for the ray tracing process. However, in other embodiments the at least one ray tracing acceleration data structure whose end nodes represent geometry may be reached by having previously traversed one or more other ray tracing acceleration data structure or structures.

Various arrangements would be possible in this regard for representing the distribution of the geometry in the scene.

In order to determine the geometry that is intersected by a given ray that is being used for the ray tracing process, the ray tracing operation according to the technology described herein thus generally comprises performing a traversal of at least one ray tracing acceleration data structure, which traversal involves testing the ray against the ray tracing acceleration data structure or structures, e.g., and in an embodiment, by testing the ray for intersection with the volumes represented by the different nodes of the ray tracing acceleration data structure or structures being traversed, to first determine with reference to the nodes volumes of the ray tracing acceleration data structure or structures being traversed which geometry is potentially intersected by the ray.

According to the technology described herein, the respective traversal operation that is performed for a particular ray starts from a respective "start point", e.g., and in an embodiment, a first ('root') node, of a first acceleration data structure that is to be traversed for that ray (which first acceleration data structure may be, e.g., and in an embodiment is, a 'top level' acceleration data structure, with at least some end nodes of the first acceleration data structure then representing other, (e.g.) 'bottom level' acceleration data structures that may need to be traversed by the ray depending on the ray's traversal of the first acceleration data structure). It can thus be determined by traversing the first acceleration data structure either that a node of the first acceleration data structure represents geometry that is potentially intersected by the ray, or that the ray should proceed to traverse a second acceleration data structure to determine with reference to the nodes of the second acceleration data structure which geometry is potentially intersected by the ray, and so on (or that the ray does not in fact intersect any geometry). That is, the traversal of the at least one ray tracing acceleration data structure that is performed in respect of a ray is performed to (at least) determine the geometry, if any, that is potentially intersected by the ray.

Once it is determined with reference to the node volumes of the ray tracing acceleration data structure or structures being traversed which (end) nodes represent sets of geometry that are potentially intersected by the ray, the ray tracing operation then tests the ray for intersection with the actual units of geometry represented by those nodes to determine which geometry, if any, is intersected (and which geometry therefore needs to be further processed for the rays for the sampling position).

Although the ray tracing process is described above in relation to a single ray for ease of explanation it will be appreciated that a typical ray tracing process will involve tracing a larger number of rays (e.g. millions of rays) through the scene in order to generate the render output. Thus, the process will be repeated for a plurality of rays that are being used for the ray tracing process to determine which geometry is intersected by which rays for the different sampling positions in the frame for the scene that is being rendered, with each ray in an embodiment being similarly processed in the manner of the technology described herein.

In the technology described herein, the overall ray tracing operation for a ray that is being used for a ray tracing process (and, generally, for each of the rays that is being used) is initially performed by a programmable execution unit of the graphics processor executing, in respect of the ray(s) in question, a graphics processing program to perform the ray tracing process. However, as will be explained further below, as part of the ray tracing program execution, the programmable execution unit is operable to trigger a ray tracing circuit (unit) to perform the necessary traversals of the ray tracing acceleration data structure or structures for the rays for which the ray tracing is being performed to determine the geometry, if any, that is intersected or potentially intersected by the rays.

That is, the ray tracing circuit (unit) is configured to, and operable to, perform respective traversals of the ray tracing acceleration data structure or structures that are to be traversed by the rays that are passed to the ray tracing circuit (unit) from the programmable execution unit. In this respect, it will be understood that the ray tracing circuit (unit) according to the technology described herein could be configured only to perform the traversals down to the respective end nodes to determine which geometry, if any, is potentially intersected by a ray, and then return a suitable indication of this (i.e. an indication of the geometry that is potentially intersected) to the programmable execution unit to perform the required geometry intersection determination. However, in an embodiment, the ray tracing circuit (unit) of the technology described herein is also operable to determine the geometry, if any, that is intersected by the rays, such that the ray tracing circuit (unit) is configured to, and operable to, manage and perform the ray-geometry intersection testing in respect of the end nodes that are found to be intersected.

Various arrangements would be possible in this respect.

The ray tracing circuit (unit) can thus process the ray(s) accordingly, e.g., and in an embodiment, to determine a result of these operations in respect of each ray that is being processed by the ray tracing circuit (unit), which result can then be used accordingly to determine how the ray should be further processed. For example, and in an embodiment, the ray tracing circuit (unit) returns a result of these operations in respect of a ray or rays to the programmable execution unit to execute a suitable shader program routine, e.g. with the shader program that is to be executed being selected based on the result of these operations (e.g. depending on which geometry, if any, is determined to be intersected by the respective ray(s)).

According to the technology described herein, therefore, when a ray is passed to the ray tracing circuit (unit), the ray tracing circuit (unit) is in an embodiment then configured to, and operable to, perform a respective traversal of the at least one acceleration data structure that is to be traversed for that ray to determine the geometry (if any) that is intersected or potentially intersected by the ray. For example, and in an embodiment, as mentioned above, the (or each) ray tracing acceleration data structure or structures comprise a plurality of nodes, each node associated with a respective volume within the scene, and wherein at least some nodes of at least one acceleration data structure represent respective sets of geometry encompassed by the respective volumes associated with the nodes of that acceleration data structure. In that case, the traversal in an embodiment involves, testing the ray for intersection with the volumes and/or geometry represented by the respective nodes of the ray tracing acceleration data structure or structures being traversed, as appropriate, to thereby determine the geometry (if any) that is intersected or potentially intersected by the ray in question.

The ray tracing circuit (unit) in an embodiment subsequently then returns a result of this operation to the programmable execution unit (e.g., and in an embodiment, by ultimately returning for each ray an indication of how the ray tracing operation should proceed based on the geometry that was determined to be intersected by the ray, or correspondingly based on the ray tracing circuit (unit) determining that the ray does not intersect any geometry within the scene), with the overall ray tracing operation then continuing accordingly, e.g. by executing an appropriate shader routine, depending on the result that is returned. This will be explained further below.

Thus, for instance, once the traversal is complete, and the ray tracing circuit (unit) has finished its processing of the ray, the (processing of the) ray can then be (and in an embodiment is) returned to the programmable execution unit for further processing of the ray, e.g. in dependence on the final result of the traversal. For example, if the ray tracing circuit (unit) determines that the ray intersects a certain type of geometry, a suitable "surface processing" operation may then be performed (e.g. by executing an appropriate "closest-hit" shader, with the "closest-hit" shader that is executed being determined and selected in dependence on the type of geometry that was found to be intersected). Conversely, if the ray tracing circuit (unit) determines that the ray does not intersect any geometry (there is an intersection "miss"), an appropriate "miss" shader may then be executed.

However, the Applicants recognise that in some situations it may be desirable to be able to execute a shader program routine during a traversal and that it may therefore be desirable to allow the ray tracing circuit (unit) to pass rays back to the programmable execution unit to execute a desired shader program routine during a traversal, i.e. before the ray tracing circuit (unit) has completed its processing the ray, and the ray tracing circuit (unit) of the technology described herein is therefore configured to, and operable to, do this as and when required when processing a ray.

That is, the Applicants recognise that there may be some situations where the ray tracing circuit (unit) may need to return (the processing of) a ray to the programmable execution unit for execution of a desired shader program routine before the ray tracing circuit (unit) has completed its processing of the ray, i.e. during the traversal operation, e.g. to determine how the traversal operation should continue. In other words, there are some situations where the ray tracing circuit (unit) may determine when performing a traversal for a ray that the ray intersects or potentially intersects geometry for which a shader program routine is required to be executed at that point, before the traversal can continue.

This may be, for example, when the ray tracing circuit (unit) determines that the ray intersects geometry for which a corresponding shader program routine should always be executed as soon as the geometry is intersected (i.e. regardless of whether it is the 'closest-hit' geometry). This may particularly be the case for certain types of non-opaque (e.g. transparent) geometry, in which case a suitable "any-hit" shader may need to be executed to determine whether or not the hit should be counted. Thus, when the ray tracing circuit (unit) determines that a ray intersects such geometry, the traversal should then be (and in an embodiment therefore is) stopped at that point to allow the ray to be returned to the programmable execution unit to execute an appropriate "any-hit" shader.

Another example would be when the ray tracing circuit (unit) determines that the ray potentially intersects certain types of geometry that the ray tracing circuit (unit) is not capable of handling. For instance, the ray tracing circuit (unit) may be able to determine the geometry intersections for certain types of primitives, e.g. that are more frequently encountered, such as simpler polygon (triangle) primitives. However, there may be other types of primitives (such as axis-aligned bounding volume primitives that the ray tracing circuit (unit) is not configured to be able to handle, and in which case, when the ray tracing circuit (unit) determines that a ray potentially intersects such primitives, the traversal should then be (and in an embodiment therefore is) stopped at that point to allow the ray to be returned to the programmable execution unit to execute an appropriate "intersection" shader.

Various other examples of where the ray tracing circuit (unit) might need to return (the processing of) a ray to the programmable execution unit before the ray tracing circuit (unit) has completed processing the ray would of course be possible, e.g. depending on the particular configuration of the ray tracing circuit (unit).

In these cases, the ray tracing circuit (unit) according to the technology described herein should therefore, and does, stop the ray's traversal at that point (i.e. at the primitive or end node in question for which the ray's (potential) intersection requires a shader program routine to be executed, and which therefore caused the traversal to be stopped) such that the ray's processing can subsequently be returned to the programmable execution unit to execute the required shader program routine.

Thus, in the technology described herein, when the ray tracing circuit (unit) determines with reference to the ray tracing acceleration data structure that is currently being traversed that the ray intersects or potentially intersects geometry that requires a shader program routine to be executed before the traversal can continue, the ray tracing circuit (unit) is configured to, and operable to, stop the traversal at that point and subsequently return the (processing of the) ray to the programmable execution unit to execute the required shader program routine.

(In this respect it will be appreciated that the ray tracing circuit (unit) may be configured to, and operable to, return rays as a group, such that (the processing of) a given ray may not, and typically will not be, returned immediately to the programmable execution unit as soon as it is determined that the ray needs to be returned, but is instead subsequently returned, e.g. once a suitable group of rays are ready to be returned to the programmable execution unit together. Various arrangements would be possible in this regard as will be explained further below.)

The technology described herein thus relates to the operation of a graphics processor having a ray tracing circuit (unit) as described above to which the programmable execution unit can offload ray tracing operations, and in particular relates to such situations where (the processing of) a ray has to be returned to the programmable execution unit before its traversal of the at least one ray tracing acceleration data structure to be traversed for that ray is completed, and wherein, after the (processing of the) ray has been returned to the programmable execution unit and the required shader program routine executed, the ray should then be (and is) returned to the ray tracing circuit (unit) to resume (and complete) its traversal.

Thus, in the technology described herein, after the programmable execution unit has executed the required shader program routine, the programmable execution unit is generally configured to, and operable, subsequently return the (processing of the) ray to the ray tracing circuit (unit) to restart the ray's respective traversal of the at least one ray tracing acceleration data structure to be traversed for that ray, and the technology described herein is particularly concerned with the operation of the graphics processor in such situations where the ray tracing circuit (unit) needs to restart (or resume) a traversal that was previously stopped.

There are various ways in which the resuming of a traversal that was previously stopped could be done.

According to the technology described herein, however, when (the processing of) a ray is returned to the ray tracing circuit (unit) in order to complete its traversal (i.e. to 'resume' a traversal that was previously stopped to allow a shader program routine to be executed as described above), the ray tracing circuit (unit) is configured to then restart the ray's traversal of the at least one ray tracing acceleration data structure to be traversed for that ray from the beginning, starting from the respective "start point" of the first ray tracing acceleration data structure to be traversed for that ray (i.e. from the same respective "start point", e.g. the same first ("root") node, of the first acceleration data structure that the traversal was initially started from when the ray was first passed to the ray tracing circuit (unit)).

Thus, for example, in the case of a multi-level arrangement of acceleration data structures, in which the ray first traverses a 'top-level' acceleration data structure, but may then, depending on the result of the traversal of the 'top level' acceleration data structure, be caused to traverse other, 'bottom level' acceleration data structures, e.g. as described above, the ray tracing unit (circuit) is configured to, and operable to, restart the traversal from the first, "root" node of the first 'top-level' acceleration data structure (such that the resumed traversal for a ray starts from the same point as the initial traversal for that ray (that was stopped)).

This then has the effect and benefit that the ray tracing circuit (unit) does not need to store (e.g. write out) the current state of the traversal record in its entirety when the traversal is stopped in order to return the ray to the programmable execution unit (and this is therefore in an embodiment not done). That is, rather than attempting to store the current traversal record in full, and then using this to resume the traversal from the point (i.e. the node or primitive) at which the traversal was stopped, the ray tracing circuit (unit) instead simply restarts the traversal from the beginning.

In this respect, it will be appreciated that attempting to store the traversal record in full may typically require a larger amount of memory, potentially requiring multiple cache lines to be stored and loaded. Thus, although the approach according to the technology described herein may require some of the traversal to be repeated, the approach according to the technology described herein may nonetheless be overall more efficient especially in terms of reducing memory bandwidth and resource that is required. This is especially so since it is expected that in a majority of typical graphics processing situations the ray tracing circuit (unit) will be able to perform the entire traversal itself, without having to return the ray to the programmable execution unit until the traversal is complete. Thus, the fact that there may be some additional processing overhead associated with repeating the traversal from the beginning is generally acceptable, and preferable to implementing a more complicated resume operation in which the traversal record is written out in full, since it is expected that in typical applications, this will be relatively rarer.

Thus, the Applicants have found that in the situation where a ray does need to be returned to the programmable execution unit before its traversal is completed, and wherein the ray is then subsequently returned to the ray tracing circuit (unit) to resume and complete its traversal, in an embodiment it may generally be preferred (in terms of overall efficiency) to restart the traversal from the beginning, rather than trying to resume from the exact point that the traversal was stopped.

The technology described herein may therefore provide various benefits compared to other possible approaches.

In some embodiments, the ray tracing circuit (unit) may simply restart the traversal from the beginning, repeating the traversal in full, testing all of the nodes of the ray tracing acceleration data structure or structures that need to be traversed by the ray accordingly until the traversal reaches the point at which it was previously stopped, and the traversal can then continue beyond that point using the result of the shader program that was executed (i.e. by testing the next node or next primitive, etc., depending on where and why the traversal was stopped).

This approach still therefore reduces memory resource burden by avoiding having to store the traversal record in its entirety. However, this approach may be relatively inefficient in terms of processing as there may be (and typically will be) various instances of node testing that have to be repeated in order to find the primitive, or end node, at which the traversal was previously stopped, thus requiring additional processing cycles, and also memory bandwidth for fetching (or re-fetching) the node data that is required for the traversal.

Therefore, the technology described herein in an embodiment attempts to accelerate the resumed traversal operation, e.g., and in an embodiment, such that some of the traversal and/or testing of the nodes during the traversal can be (and is) skipped or omitted when the traversal is restarted, when it is possible to do so.

To facilitate this, in embodiments of the technology described herein, when the ray tracing circuit (unit) is required to return (the processing of) a ray to the programmable execution unit before the ray's traversal is completed, the ray tracing circuit (unit) is configured to, and operable to, store at that point one or more indicators of the progress of the ray's traversal through the at least one acceleration data structure, which one or more indicators can then subsequently be used by the ray tracing circuit (unit) when the ray's processing is subsequently returned to the ray tracing circuit (unit) to restart it's traversal to accelerate the ray's restarted traversal.

Thus, in embodiments, the method further comprises (the graphics processor is configured to):
when the ray tracing circuit (unit) returns (the processing of) a ray to the programmable execution unit to execute a shader program before its traversal of the at least one ray tracing acceleration data structure is completed, (the ray tracing circuit (unit)) storing one or more indicators of the progress of the ray's traversal through the at least one ray tracing acceleration data structure up to the point at which the traversal was stopped; and
when the ray's processing is subsequently returned to the ray tracing circuit (unit) to restart its traversal of the at least one ray tracing acceleration data structure, the ray tracing circuit (unit) using the stored one or more indicators of the progress of the ray's traversal through the at least one ray tracing acceleration data structure up to the point at which the traversal was stopped to accelerate the restarted traversal of the at least one ray tracing acceleration data structure.

So long as the one or more indicators are available to the ray tracing circuit (unit) when the traversal is to be restarted, the indicators may be stored or provided in any suitable and desired manner.

For example, in an embodiment, when (and in an embodiment whenever) the ray tracing circuit (unit) has to return (the processing of) a ray to the programmable execution unit, the ray tracing circuit (unit) writes to a 'ray data' data structure in memory various information regarding the ray, and it's traversal so far, and this information in an embodiment includes the one or more indicators of the progress of the ray's traversal of the at least one ray tracing acceleration data structure up to the point at which the traversal was stopped.

Thus, in embodiments, when the ray tracing circuit (unit) stops a ray's traversal, before (the processing of) the ray is returned to the programmable execution unit, the ray tracing circuit (unit) writes the one or more indicators to memory. In that case, when the (processing of the) ray is subsequently returned to the ray tracing circuit (unit) to resume the ray's traversal of the at least one ray tracing acceleration data structure, the ray tracing circuit (unit) can then (and does) obtain the one or more indicators from memory.

Various other arrangements would however be possible. For example, the ray tracing circuit (unit) could instead directly pass the indicators to the programmable execution unit, e.g. via registers, with the programmable execution unit correspondingly then returning the indicators together with the ray to the ray tracing circuit (unit) when the traversal is to be restarted in the same manner, e.g. by including in the messages that are passed between the two units an indication of the register where the indicators are stored.

When (the processing of) a ray is returned to the ray tracing circuit (unit) to restart its traversal, the message that is sent by the programmable execution unit in that case in an embodiment then indicates that the ray is a ray for which a previous traversal should be resumed (e.g. rather than that the ray is a new ray for which a traversal should be performed), such that the ray tracing circuit (unit) can then obtain the relevant information including the stored one or more indicators from the 'ray data' data structure that was previously written to when the traversal was stopped and use this information accordingly to accelerate the restarted traversal.

That is, the message that is sent to the ray tracing circuit (unit) in this situation in an embodiment triggers the ray tracing circuit (unit) to perform a particular "resume" operation (which is in an embodiment different to the 'normal' operation of ray tracing circuit (unit) when a new ray is passed to it for processing).

Subject to the requirements of the technology described herein, the indicators may take any suitable and designed form and may generally indicate the progress of the ray's traversal in any suitable manner.

As mentioned above, the technology described herein in an embodiment avoids writing out the traversal record in full. Thus, the one or more indicators in an embodiment comprise a reduced (smaller) set of information compared to the entire traversal record.

Various arrangements are contemplated in this regard, e.g., and in particular, in dependence of the form of the ray tracing acceleration data structure or structures that are being traversed.

For example, in an embodiment, as described above, one reason that the traversal may be stopped is because the ray tracing circuit (unit) has determined that the ray intersects geometry (e.g. a primitive) for which a shader program routine (e.g., and in particular, an "any-hit" shader) needs to be executed at that point, before the traversal continues to the next item of geometry (primitive) (or next node, etc.).

Typically, and in an embodiment, the geometry is represented as graphics "primitives" in which case each of the primitives defined for the scene will typically have an associated primitive index uniquely identifying that primitive (either relative to the scene as a whole, or within a respective local instance or ray tracing acceleration data structure). Thus, in an embodiment, the one or more indicators that are stored include an indication (e.g. in the form of the primitive index for the primitive) of the geometry (e.g. primitive) that caused the traversal to stop. Thus, when traversal is restarted, the traversal can skip testing of any geometry (primitives) that do not match the geometry (e.g. primitive) that is indicated within the set of stored indicators.

In an embodiment, a given end node that represents geometry will typically not just represent a single item of geometry (e.g. a single primitive) but will instead be associated with a set of plural geometry (e.g. a set of plural (e.g. three) primitives). Thus, in an embodiment, the one or more indicators that are stored also include an indication of the end node containing the item of geometry (e.g. primitive) that caused the traversal to be stopped. Again, in that case, when traversal is restarted, the traversal can skip testing of any end nodes that do not match the end node that is indicated within the set of stored indicators.

For instance, and in an embodiment, when the traversal reaches an end node that represents geometry, using the stored indication to determine whether or not the end node needs to be tested, and when it is determined based on the stored indicator that the end node does not need to be tested, the method comprises (the ray tracing circuit (unit)) skipping testing that end node.

In this case, it may also be desirable to be able to indicate which of the items of geometry (primitives) in a set of geometry (primitives) represented by the end node containing the geometry (primitive) that caused the ray's traversal to be stopped still need to be tested when the ray's traversal is resumed. For example, in a set of three primitives, it may be the second primitive that caused the traversal to be stopped. In that case, there is no need as such to re-test the first primitive (but the third primitive will still need to be tested). Thus, the one or more indicators that are stored in an embodiment also contain an indication of which primitives in a set of primitives represented by the end node containing the primitive that caused the traversal to be stopped still need to be tested when the traversal is restarted. This indication may be provided, for example, in the form of a bit mask with the respective bits representing which of the primitives have been tested (such that the first bit, if set, may indicate that the first primitive has been tested, and so on).

In some embodiments, as described above, the ray tracing process in the technology described herein uses a multi-level arrangement of ray tracing acceleration data structures. In that case, the one or more indicators that are stored may, and in an embodiment do, also include an indication of the ray tracing acceleration data structure (e.g. or object "instance") containing the geometry (primitive) that caused the traversal to be stopped. Thus, when traversal is restarted, the traversal of the top level ray tracing acceleration data structure can skip testing of any end nodes representing instances that do not match the instance that is indicated within the set of stored indicators.

Thus, in embodiments, the ray tracing process uses a two-level arrangement of ray tracing acceleration data structures comprising a first, top level ray tracing acceleration data structure and one or more second, bottom level ray tracing acceleration data structures, wherein the one or more second, bottom level ray tracing acceleration data structures are associated with respective end nodes of the first, top level ray tracing acceleration data structure, and wherein the one or more indicators of the progress of the ray's traversal that are stored when the traversal is restarted include an indication of the second, bottom level ray tracing acceleration data structure that contains the geometry (primitive) that caused the traversal to be stopped.

In that case, when the traversal is restarted, when the traversal reaches an end node of the first, top level ray tracing acceleration data structure that represents a second, bottom level ray tracing acceleration data structure, using the stored indication to determine whether or not the second, bottom level ray tracing acceleration data structure needs to be traversed, and when it is determined based on the stored indicator that the second, bottom level ray tracing acceleration data structure does not need to be traversed, the method comprises (the ray tracing circuit (unit)) skipping traversing that second, bottom level ray tracing acceleration data structure.

Thus, the one or more indicators of the progress of the ray's traversal that are stored when the traversal is stopped may, and in an embodiment do, include one or more of: (i) an indication of the geometry (primitive) that caused the traversal to be stopped; (ii) an indication of the end node containing the geometry (primitive) that caused the traversal to be stopped; (iii) an indication of the ray tracing acceleration data structure or instance containing the geometry (primitive) that caused the traversal to be stopped; and (iv) an indication of which items of geometry (primitives) in a set of geometry (primitives) represented by the end node containing the primitive that caused the traversal to be stopped still need to be tested when the traversal is restarted.

Various other arrangements are of course contemplated and in general the indicator may contain any suitable and desired information that may be used to accelerate the traversal for a ray when it is restarted.

The indicator or indicators, in whatever form they take, are then used by the ray tracing circuit (unit) accordingly when the traversal is restarted in order to accelerate the traversal, e.g., and in particular, by skipping or omitting some or all of the traversal operation where it is possible to do so.

Thus, the ray tracing circuit (unit) when performing a 'restarted' traversal for a ray, as part of the restarted traversal may, and in an embodiment does, use the one or more indicators of the progress of the ray's traversal that were stored when the traversal was stopped to try to acceleration the traversal operation, in particular by using the indicators to determine whether the restarted can skip or omit testing of at least some of the nodes of the acceleration data structure or structures to be traversed. Thus, when the ray tracing circuit (unit) determines based on the stored indicators that it is possible to skip or omit testing of a particular node, the testing of that node is accordingly skipped or omitted, and the traversal can then move directly to the next node, e.g., and in an embodiment, without having to process the node that is skipped further (and hence without having to load in the data for that node, etc.).

Thus, in embodiments, the ray tracing circuit (unit) when performing a restarted traversal for a ray, as part of the restarted traversal may, and in an embodiment does, before testing the ray for intersection with a given node (volume), first check whether testing of that node can be skipped or omitted based on the stored indicators, and when it is determined based on the stored indicators that testing of that node can be skipped or omitted, the traversal can then move to the next node without having to explicitly perform the testing of that node. For example, in embodiments, it is first checked during the restarted traversal whether one or more characteristics of the node match a corresponding characteristic that was stored as part of the one or more indicators of the progress of the ray's traversal. If there is no match, the testing of that node can then be skipped and the traversal can move to the next node without having to explicitly repeat the testing of that node.

The stored indicators can thus be used by the ray tracing circuit (unit) accordingly to accelerate the traversal, e.g., and in an embodiment, by avoiding testing any instances, geometry and/or primitives that do not match those that are indicated by the one or more indicators.

In this way, the stored indicators can help to reduce the amount of additional processing that is introduced by having to restart the traversal from the beginning, thus providing a more efficient graphics processor operation.

Various other optimisations may also be performed to try to accelerate the restarted traversal.

For instance, in addition to (or in some embodiments alternatively to) providing such indicators of the progress of the ray's traversal so far, the ray tracing circuit (unit) is in an embodiment also configured to, and operable to, when the ray tracing circuit (unit) is required to return a ray to the programmable execution unit before the ray's traversal is completed, write out a set of updated 'ray data' including one or more parameters defining the ray. This means when the ray tracing circuit (unit) has to restart a traversal for a ray, the ray tracing circuit (unit) can at that point obtain the updated 'ray data' for the ray in question, and it may be possible to cull some of all of the ray tracing acceleration data structure or structures to be traversed based on the updated 'ray data'.

Thus, in embodiments, when the ray tracing circuit (unit) stops a ray's traversal, before the ray is returned to the programmable execution unit, the ray tracing circuit (unit) writes to memory a set of updated parameters defining the ray. The method then comprises: when the ray is subsequently returned to the ray tracing circuit (unit) to resume its traversal of the at least one ray tracing acceleration data structure, the ray tracing circuit (unit) using the updated parameters defining the ray to attempt to cull some or all of the at least one ray tracing acceleration data structure to be traverse for the ray.

In this respect, it will be appreciated that depending on the result of the traversal (so far), the ray's distance (or range) into the scene may be shortened. In particular, if it is determined during the traversal that the ray intersects a certain opaque geometry, this means that the ray cannot then propagate beyond that opaque geometry, and the ray's length can accordingly be shortened. In that case, if the ray can be shortened, this may in turn then allow part of the ray tracing acceleration data structure to be culled, thus saving having to traverse that part of the ray tracing acceleration data structure.

Thus, in embodiments, the parameters defining the ray are in an embodiment updated during a traversal operation. When the traversal is stopped, the updated ray parameters are in an embodiment then stored, and in an embodiment also passed back to the programmable execution unit, such that when the ray's traversal is restarted, the restarted traversal can then be (and is) performed using the updated ray parameters.

This can therefore help to further accelerate the traversal for a ray when the traversal has to be restarted.

This may be particularly efficient since in embodiments the ray parameters would anyway need to be stored and/or provided back to the programmable execution unit at the point at which a ray is returned to the programmable execution unit (whether that is before the traversal is completed or at the end of a traversal) so this possibility for increased culling of the ray tracing acceleration data structure(s) can effectively be achieved for 'free', without requiring any additional data paths or structures.

Various other arrangements would be possible in this respect for attempting to accelerate the traversal for a ray when the traversal has to be restarted.

The effect of all this therefore is to provide a particularly efficient approach for resuming a traversal in the situation where the ray tracing circuit (unit) needs to stop the traversal in order to pass the ray back to the programmable execution unit to allow a shader program routine to be executed, but wherein the ray subsequently needs to be returned to the ray tracing circuit (unit) to resume (and complete) it's respective traversal.

Subject to the particular requirements of the technology described herein the graphics processor may otherwise be operated in any suitable and desired manner.

For example, to further facilitate the operation of the graphics processor in this way, the technology described herein in an embodiment provides a set of one or more dedicated 'ray tracing' instructions (e.g., and in an embodiment, a single dedicated 'ray tracing' instruction) that can be included into graphics processing programs to perform ray tracing and which instructions, when executed by a group of one or more execution threads that are executing a program to perform ray tracing for a corresponding group of one or more rays, which program includes such instruction(s), cause the programmable execution unit to trigger the ray tracing circuit (unit) to determine the geometry (if any) intersected by the rays in the group of one or more rays by performing appropriate traversals of the acceleration data structure for the rays in question.

That is, in the technology described herein, the overall ray tracing operation is in an embodiment initially performed by a programmable execution unit of the graphics processor executing a graphics processing program to perform the ray tracing operation, as mentioned above. However, when the program to perform the ray tracing requires a determination of which geometry, if any, is intersected by a ray, the 'ray tracing' instruction(s) can be (and are) included into the program appropriately, such that when the set of instructions is executed as part of the program execution, the programmable execution unit is then caused to message the ray tracing circuit (unit) and trigger the ray tracing circuit (unit) to perform the required traversals and to determine the geometry, if any, that is intersected by the ray in question.

Subject to the particular requirements of the technology described herein, the programmable execution unit can be any suitable and desired programmable execution unit (circuit) that a graphics processor may contain. It should thus be (and is) operable to execute graphics shading programs to perform graphics processing operations. Thus the programmable execution unit will receive graphics threads to be executed, and execute appropriate graphics shading programs for those threads to generate the desired graphics output.

Once a thread has finished its respective processing operation, the thread can then be 'retired', e.g. and a new execution thread spawned in its place.

The graphics processor may comprise a single programmable execution unit, or may have plural programmable execution units. Where there are a plural programmable execution units, each programmable execution unit can, and in an embodiment does, operate in the manner of the technology described herein. Where there are plural programmable execution units, each programmable execution unit may be provided as a separate circuit to other programmable execution units of the data processor, or the programmable execution units may share some or all of their circuits (circuit elements).

The (and each) programmable execution unit should, and in an embodiment does, comprise appropriate circuits (processing circuits/logic) for performing the operations required of the programmable execution unit.

As is often the case for graphics processors, the programmable execution unit in the technology described herein is in an embodiment operable to execute programs for groups of plural threads together (which execution thread groups are often referred to as "warps", and the terms "warp" and "execution thread group" may both be used in the present application to refer to such groups of threads that are executed together), e.g. in lockstep, e.g., one instruction at a time, e.g. in a single instruction, multiple thread (SIMT) execution state. In that case, each individual thread in a respective thread group (warp) may therefore, and in an embodiment does, execute a graphics processing program to perform ray tracing for a respective ray, such that the program is executed for a corresponding group of plural rays (although it will be appreciated here that some threads within a respective thread group may be 'inactive' in which case there is no corresponding ray for which the program is being executed, e.g. since the ray has been discarded by this point (and hence the corresponding thread terminated), or since the thread group was originally spawned for fewer rays than the number of available execution lanes (i.e. the group of rays for which the ray tracing is being performed by a respective thread group is smaller in number than the maximum width of a thread group (warp)).

The graphics processor may thus be configured to, and operable to, group rays that are to execute a program to perform ray tracing together, such that the ray tracing program is (at least initially) executed by a respective execution thread group for a corresponding group of rays.

Once a group of rays to execute the ray tracing program together have been selected, then the rays should be processed together as a group, e.g. by spawning a suitable execution thread group, and causing the execution thread group to execute a program that causes the plural rays to execute the ray tracing program together, e.g. in the manner described above.

Thus, in the technology described herein, the group of one or more execution threads for which the ray tracing program is being executed may, and in an embodiment does, comprise plural execution threads, and corresponds to a thread group (warp) that is executing the program together, e.g. in lockstep. In an embodiment, the group of execution threads comprises more than two execution threads, such as four, eight or sixteen (or more, such as 32, 64 or 128) execution threads.

Accordingly, the programmable execution unit in the technology described herein is in an embodiment operable to trigger the ray tracing circuit (unit) to perform geometry determination operations for groups of rays (e.g. up to a full warp's worth of rays) at the same time. Thus, in embodiments, in response to an execution thread group executing the 'ray tracing' instruction(s), the programmable execution unit then sends a message to the ray tracing circuit (unit) to determine the geometry, if any, that is intersected by respective rays in a group of plural rays. For example, and in an embodiment, the programmable execution unit sends a message to the ray tracing circuit (unit) to process all rays for which a corresponding execution thread in the execution thread group that executed the 'ray tracing" instruction(s) is executing the program to perform ray tracing (i.e. all rays for which an execution thread is actively executing the program to perform ray tracing). (On the other hand, any execution threads that are inactive, i.e. do not correspond to any ray that is currently active for the ray tracing program are in an embodiment ignored by the ray tracing circuit (unit).)

Thus, in embodiments, there is a group of plural execution threads that is executing the program to perform ray tracing for a corresponding group of plural rays and, in response to the threads in the group of plural execution threads executing the set of one or more ray tracing instructions that are included in the program, the programmable execution unit is configured to send (and does send) a message to the ray tracing circuit (unit) in respect of the group of plural rays to determine, for at least one ray in the group (e.g., and in an embodiment, for each of the plurality of rays in the group), the geometry, if any, that is intersected by the ray(s).

As will be explained further below, however, the ray tracing circuit (unit) is in an embodiment then configured to process and treat the rays in the group of rays that triggered the operation of the ray tracing circuit (unit) individually for the purposes of determining the respective geometry that is intersected by the respective rays that are passed to the ray tracing circuit (unit), such that the ray tracing circuit (unit) is configured to, and operable to, determine the geometry that is intersected by each of the rays that are to be processed by the ray tracing circuit (unit) individually, with a separate determination in an embodiment being performed for each individual ray for which the ray tracing circuit (unit) has been messaged in order to determine the geometry that is intersected by the ray (although it will be appreciated here that there may be some situations wherein some rays might be discarded within the ray tracing circuit (unit), e.g. if the overall ray tracing operation is terminated early, such that the ray tracing circuit (unit) does not in fact actually perform a geometry intersection determination for the discarded ray(s) even though it was messaged to do so).

In other words, once the rays have been passed to the ray tracing circuit (unit), the ray tracing circuit (unit) in an embodiment then processes the rays separately for the purposes of determining the geometry (if any) that is intersected or potentially intersected by the rays (rather than attempting to traverse the ray tracing acceleration data structure for a group of rays together, for example).

The ray tracing circuit (unit) is thus operable to determine a respective, separate result (i.e. a respective determination of the intersected geometry (e.g., and in an embodiment, the 'closest-hit' geometry)) for each respective ray that is being processed by the ray tracing circuit (unit).

In an embodiment the ray tracing circuit (unit) also returns to the programmable execution unit an indication of a shader program routine (e.g. in terms of a shader index identifying the shader program routine) to be executed for the further processing of the ray. In this respect, the present Applicants recognise that having the ray tracing circuit (unit) performing the ray tracing operations up to and including the determination of the shader program routine to be executed may be particularly efficient since the ray tracing circuit (unit) can in that case perform the required calculations consistently using appropriate (hardware) circuitry (circuit) that is configured to do so, at a desired level of precision whilst still ensuring correct results, and avoiding having to manage or repeat these calculations across different processing elements (i.e. as may be the case if the rays were returned to the programmable execution unit earlier, prior to the shader (index) determination). The Applicants have thus found that having the ray tracing circuit (unit) manage and perform the ray tracing operations up to and including the determination of the required shader program routine that is to be executed for a ray (before the ray is then returned to the programmable execution unit for execution of the required shader program routine) provides a particularly efficient graphics processor operation. Thus, the ray tracing circuit (unit) is in an embodiment operable to determine a respective shader program or programs to be executed for each individual ray.

Once the ray tracing circuit (unit) has finished processing a ray or set of rays, the ray tracing circuit (unit) in an embodiment then messages the programmable execution unit accordingly, e.g. to provide the programmable execution unit with the shader index identifying the shader program or programs that should be executed for the further processing of the individual ray or rays in question.

It will be appreciated in this respect that even though the ray tracing circuit (unit) performs a separate determination for each individual ray, the ray tracing circuit (unit) may, and in an embodiment does, group of plurality of rays to be returned for further processing to the programmable execution circuit (unit) together, e.g., and in an embodiment, by sending a message to the programmable execution unit in respect of a group of plural rays in one go (e.g. in an analogous manner to the initial messaging of the ray tracing circuit (unit) by the programmable execution unit to trigger the geometry intersection determinations for a group (e.g. up to a warp's worth) of rays in one go).

Thus, the ray tracing circuit (unit) is in an embodiment configured to, and operable to, determine which geometry, if any, is intersected by an individual ray that is being used for the ray tracing process and which ray has been passed to the ray tracing circuit (unit) in the manner described above. However, the ray tracing circuit (unit) is in an embodiment then configured to, and operable to, return a result of the geometry determination (e.g. by indicating a respective shader program routine to be executed) for a group of one or more, e.g., and in an embodiment, plural, rays in one go. Thus, the ray tracing circuit (unit) in an embodiment sends a message to the programmable execution unit in respect of a group of rays to trigger further processing of the rays in the group of rays by a group of execution threads that has been spawned for processing the group of rays executing a corresponding one or more shader program routine for further processing the rays.

The ray tracing circuit (unit) could be configured to process one ray at a time, e.g. such that when the operation of the ray tracing circuit (unit) is triggered for a group of rays, the respective rays within the group are then processed sequentially, one after another.

In an embodiment however the ray tracing circuit (unit) is operable to process multiple rays in parallel (e.g. simultaneously). The ray tracing circuit (unit) may therefore be configured to have a plurality of parallel processing 'lanes', each of which is operable to manage a traversal for a respective ray. The ray tracing circuit (unit) may be configured and operable to traverse any desired number of rays in parallel. For example, the ray tracing circuit (unit) may be configured so that the number of lanes available for traversals is the same as the number of threads that the programmable execution unit can execute together (e.g. in lockstep) as part of a (single) respective thread group. However, in general, the ray tracing circuit (unit) may be configured to trace greater or fewer rays than the number of rays within a respective execution thread group of the programmable execution unit.

This can then provide various benefits in terms of sharing resource, e.g. memory access, across multiple rays that are being processed by the ray tracing circuit (unit) in parallel.

For example, as will be explained further below, the ray tracing circuit (unit) operation for a single ray typically involves fetching in from memory various node data associated with the nodes of the ray tracing acceleration data structure that is being traversed (which node data may comprise node volume data, but when the node is an end node may also comprise geometry data or data identifying another ray tracing acceleration data structure that is to be traversed, for example, depending on the construction of the ray tracing acceleration data structure) and then testing the ray against the node using the associated node data as appropriate.

Thus, the ray tracing circuit (unit) is in an embodiment operable to process multiple rays in parallel, and the different rays in an embodiment have access to shared resources, such as a shared memory access path via which the desired node data can be (and is) fetched from memory, as required.

This can then help further improve the efficiency of the ray tracing process determinations since the fetching of the node data and the corresponding testing of the rays can be managed entirely by the ray tracing circuit (unit) and can thus be performed in a more optimised manner (e.g. compared to using the programmable execution unit to do this).

Various arrangements would be possible in this regard for optimising the parallel processing of multiple different rays within the ray tracing circuit (unit).

The operation of the ray tracing circuit (unit) in the technology described herein, as mentioned above, can be (and is) triggered in response to a group of one or more threads that is executing a program to perform ray tracing in respect of a corresponding group of one or more rays executing a set of one or more 'ray tracing' instructions (or a single 'ray tracing' instruction) that has been included into the program to perform ray tracing.

Thus, in response to the threads executing the instruction(s), the programmable execution unit is then configured to message the ray tracing circuit (unit) to cause the ray tracing circuit (unit) to begin processing the rays in the group of rays to determine, for the respective rays, the geometry, if any, that is intersected by the rays. Upon receiving such message from the programmable execution unit, the ray tracing circuit (unit) thus creates the rays for which the geometry determination is to be performed, and then processes them accordingly to determine the geometry, if any, that is intersected by the rays.

In order to create the rays that are to be processed, the ray tracing circuit (unit) thus needs to obtain suitable data defining the rays that are to undergo the ray tracing. The ray data defining the rays that are to be traced is typically ultimately stored in external memory, e.g. main memory. The ray tracing circuit (unit) could therefore load the data defining the rays from its location in memory, e.g., and in an embodiment, via a cache system (e.g. a load/store cache) of the graphics processor.

That is, when the programmable execution unit is caused to trigger the ray tracing circuit (unit), the programmable execution unit could, e.g., store the ray data in memory, as appropriate, at that point, and the ray tracing circuit (unit) could then load the ray data back in to perform the desired geometry determinations. Thus, the ray data for defining the rays for which traversals are to be performed could therefore be passed between the programmable execution unit and the ray tracing circuit (unit) via the memory system, and in embodiments this may be done. However, this may be relatively inefficient.

In an embodiment, therefore, the message that is sent by the programmable executing unit in respect of a given ray to trigger the ray tracing circuit (unit) to determine the geometry, if any, that is intersected by that ray also includes the parameters for creating that ray. That is, the programmable execution unit in an embodiment loads the ray data defining the ray(s) at the start of the program execution, but then passes the ray data defining the ray(s) to the ray tracing circuit (unit) when required, without the ray tracing circuit (unit) having to load the data from the memory system. This then saves the ray tracing circuit (unit) having to load the rays back in from memory when the ray tracing circuit (unit) is to be used (and correspondingly also saves the programmable execution unit having to store the rays in memory at this point).

Thus, in embodiments, the message that is sent by the programmable execution unit to the ray tracing circuit (unit) indicates one or more parameters defining the ray (and in an embodiment the rays) for which a traversal is to be performed by the ray tracing circuit (unit).

For example, each ray may be, and in an embodiment is, defined in terms of the origin (originating position (e.g. x, y, z coordinates)) for the ray that is to be tested (for which the traversal of the ray tracing acceleration data structure is to be determined); the direction of (a direction vector for) the ray that is to traverse the ray tracing acceleration data structure; and the range (distance) that the ray is to traverse (the (minimum and/or maximum) distance the ray is to traverse into the scene).

In embodiments, the message thus includes parameters indicative of one or more of: the ray's origin, the ray's direction and the ray's range. These parameters may be indicated in any suitable and desired manner. For example, and in an embodiment, the ray data is initially loaded in by the programmable execution unit into a set of registers associated with the programmable execution unit, and in that case the message may include a pointer to relevant data defining the ray (e.g. a pointer to the register(s) storing that data). Alternatively, the message may include one or more fields for directly indicating at least some of the parameters defining the ray. Various other arrangements would of course be possible in this regard.

Thus, the ray parameters for creating a new ray are in an embodiment passed to the ray tracing circuit (unit) via registers, e.g. rather than via memory.

(For instance, when executing an instruction in a program, the programmable execution unit (e.g. the appropriate functional unit, such as an arithmetic unit, of the programmable execution unit) will typically read one or more input data values (operands), perform a processing operation using those input data values to generate an output data value, and then return the output data value, e.g. for further processing by subsequent instructions in the program being executed and/or for output (for use otherwise than during execution of the program being executed). The input data values to be used when executing the instruction will typically be stored "locally" in an appropriate set of registers (a register file) of and/or accessible to the execution (functional) unit, and the output data value(s) generated by the execution (functional) unit when executing the instruction will correspondingly be written back to that storage (register file).

To facilitate this operation, each execution thread, when executing a shader program, will correspondingly be allocated a set of one or more registers for use by that thread when executing the shader program. Thus when executing an instruction, an execution thread will read input data values (operands) from a register or registers of a set of one or more registers allocated to that thread, and write its output value(s) back to a register or registers of the thread's register allocation. The data will be loaded into the registers, and written out from the registers, from and to an appropriate memory system of or accessible to the graphics processor (e.g. via an appropriate cache system (cache hierarchy)).)

Thus, as well as the programmable execution unit, the graphics processor includes a group of plural registers (a register file) operable to and to be used to store data for execution threads that are executing. Each thread of a group of one or more execution threads that are executing a shader program will have an associated set of registers to be used for storing data for the execution thread (either input data to be processed for the execution thread or output data generated by the execution thread) allocated to it from the overall group of registers (register file) that is available to the programmable execution unit (and to execution threads that the programmable execution unit is executing).

The group(s) of registers (register file(s)) can take any suitable and desired form and be arranged in any suitable and desired manner, e.g., as comprising single or plural banks, etc.

The graphics processor will correspondingly comprise appropriate load/store units and communication paths for transferring data between the registers/register file and a memory system of or accessible to the graphics processor (e.g., and in an embodiment, via an appropriate cache hierarchy).

Thus the graphics processor in an embodiment has an appropriate interface to, and communication with memory (a memory system) of or accessible to the graphics processor.

The memory and memory system is in an embodiment a main memory of or available to the graphics processor, such as a memory that is dedicated to the graphics processor, or a main memory of a data processing system that the graphics processor is part of. In an embodiment, the memory system includes an appropriate cache hierarchy intermediate the main memory of the memory system and the programmable execution unit(s) of the graphics processor.

The message that triggers the ray tracing circuit (unit) to perform a traversal for a given ray may also contain any other suitable parameters, or other information, that may desirably be passed from the programmable execution unit to the ray tracing circuit (unit). For example, in the case where there are plural different ray tracing acceleration data structures, the message may also indicate which ray tracing acceleration data structure the ray should traverse (e.g. by reference to a 'root' node of a ray tracing acceleration data structure at which the ray should begin its traversal).

At least in the case where the graphics processor includes plural programmable execution units, the message in an embodiment also indicates the sender of the message (i.e. which programmable execution unit has sent the message), so that the result of the traversal can be returned to the correct programmable execution unit.

The message that is sent to the ray tracing circuit (unit) by the programmable execution unit may also contain other information including, for example, an indication of a "miss" shader (which indication may be, e.g., and in an embodiment is, provided in the form of a miss shader index identifying the required "miss" shader from a plurality of available "miss" shaders) that should be executed in the event that the ray tracing circuit (unit) determines the ray does not intersect any geometry (such that in that event the ray tracing circuit (unit) can then look up the relevant "miss" shader in the shader binding table using the provided miss index and then return the specified "miss" shader back to the programmable execution unit for execution).

In embodiments, as mentioned above, the ray tracing circuit (unit) is also operable to pass rays back to the programmable execution unit, e.g. in order to execute a desired shader program routine for further processing the ray in question. For example, this may be when the ray tracing circuit (unit) has completed its processing of a ray. In that case, the ray tracing circuit (unit) in an embodiment sends a message to the programmable execution unit to execute the desired shader program routine.

The ray tracing circuit (unit) may however also message the programmable execution unit to execute a desired shader program routine, e.g. an "intersection" or "any-hit" shader, before the processing of the ray by the ray tracing circuit (unit) is completed (i.e. during a traversal of a ray tracing acceleration data structure). For example, this may be the case when the ray tracing circuit (unit) determines that a ray intersects or potentially intersects certain types of geometry for which a shader is required to be executed in order to determine whether or not the intersected should be counted. In that case, once the desired shader program routine has been executed, the programmable execution unit should therefore (and in an embodiment does) pass the ray back to the ray tracing circuit (unit) in order for the ray tracing circuit (unit) to resume the ray's traversal.

In that case, the messages that are passed back and forth between the programmable execution unit and the ray tracing circuit (unit) may, and in an embodiment do, also indicate the current progress or status of the ray's traversal. This information can then be used as explained above to accelerate the traversal when it is resumed, e.g. by allowing at least some testing to be skipped when the traversal is resumed when the result of that testing is known already from the previous traversal (i.e. the traversal that was stopped to execute the shader program routine).

Thus, the message that is sent to the ray tracing circuit (unit) may further indicate a current progress or status of the ray's traversal. This will be explained further below.

In either of these cases when a ray is returned by the ray tracing circuit (unit) to the programmable execution unit, the message that is sent by the ray tracing circuit (unit) to the programmable execution unit in an embodiment includes an indication of the reason that the ray is being returned, and in an embodiment an indication of the shader program routine that is to be executed (e.g. a shader index identifying the required shader program routine).

As noted above, the ray tracing circuit (unit) is in an embodiment configured to, and operable to, return groups of one or more rays to the programmable execution unit together, such that the programmable execution unit can spawn a respective group of one or more execution threads for processing the rays. Thus, in an embodiment, the ray tracing circuit (unit) is in an embodiment configured to return a result of the traversal operation to the programmable execution unit (by sending a suitable message indicating the result) in respect of groups of plural rays, in particular corresponding to a group of rays for which shader programs can be executed by a respective execution thread group within the programmable execution unit.

Thus, in an embodiment the ray tracing circuit (unit) returns the result for a group of plural rays in one go. In this respect, it will be appreciated that the ray tracing circuit (unit) does not need to return the same group of rays that was executing as a part of a respective thread group that triggered the operation ray tracing circuit (unit). Thus, whilst the ray tracing circuit (unit) may, and in some embodiments does, maintain the original groups of rays, in an embodiment the ray tracing circuit (unit) is operable to return arbitrary groups of rays to the programmable execution unit for which a respective thread group can then be spawned. In some embodiments, therefore, the ray tracing circuit (unit) is operable to re-group the rays, e.g., and in an embodiment, to try to optimise the continued execution of the ray tracing program. For example, the ray tracing circuit (unit) may attempt to return a group of rays that will require the same shader routine to be executed (e.g. to increase code coherency), or that are spatially close to each other. Alternatively, the ray tracing circuit (unit) may simply group rays on the basis of completion time, e.g., in a 'first-to-finish' manner, to ensure continued throughput. Various other arrangements would be possible in this regard.

In an embodiment, the message that is sent by the ray tracing circuit (unit) (back) to the programmable execution unit also includes the parameters defining the ray (e.g. the same parameters that were sent by the programmable execution unit to the ray tracing circuit (unit)).

In this respect it will be appreciated that the traversal operation performed by the ray tracing circuit (unit) may allow the ray's properties to be updated. For example, in response to determining that the ray intersected some opaque geometry, the range (distance) that the ray is to traverse may be shortened (since it is known that the ray will not traverse into the scene beyond the intersected opaque geometry). Because the traversal is managed by the ray tracing circuit (unit), the ray tracing circuit (unit) should therefore, and in an embodiment does, pass the (updated) parameters defining the ray back to the programmable execution unit.

(It will be appreciated that in the situation where the processing of a ray is returned to the programmable execution unit for execution of a desired "intersection" or "any-hit" shader, and wherein the ray will subsequently be passed back to the ray tracing circuit (unit) to complete its processing, passing the updated ray parameters to the programmable execution unit at this point, such that they can then be returned to the ray tracing circuit (unit) accordingly when its processing of the ray is to be continued, can also help to accelerate the resumed processing of the ray by the ray tracing circuit (unit) as in this case the updated ray parameters may allow further culling of the ray tracing acceleration data structure or structures that are to be traversed. This can therefore provide further benefits in that regard.)

In embodiments, before the ray tracing circuit (unit) returns a ray to the programmable execution unit, the ray tracing circuit (unit) in an embodiment also stores the (updated) parameters defining the ray, and any other information about the result of the traversal so far, such as the determination of the geometry, if any, that has been found to be intersected by the ray, e.g., and in an embodiment, in memory. That is, when the ray tracing circuit (unit) needs to return (the processing of) a ray to the programmable execution unit, the ray tracing circuit (unit) in an embodiment writes the result of its processing operations to memory at this point, so that the data is available for further use. Again, having the ray tracing circuit (unit) manage the memory write operations helps reduce memory access bandwidth since the ray tracing circuit (unit) is in an embodiment configured to handle most of the processing itself, such that the number of memory writes can in an embodiment be reduced. For instance, in typical cases, it is expected that the ray tracing circuit (unit) may only need to pass rays back to the programmable execution unit once the processing of the ray is completed (that is it is expected to be relatively rarer that a ray may be returned before the processing is completed), such that the result, and the updated ray data, etc., can be written to memory in a single, relatively 'wider' memory transaction.

In an embodiment the returning and writing to memory of the parameters defining the ray by the ray tracing circuit (unit) can be selectively enabled. For instance, in some cases, the programmable execution unit may simply need to know the reason that the ray has been returned, but without needing the updated ray data. In that case, the message that is sent to the ray tracing circuit (unit) by the programmable execution unit may indicate using a suitable field or flag that no ray data needs to be stored for the ray in question.

Various arrangements would be possible in this regard.

The messages that are sent between the ray tracing circuit (unit) and the programmable execution unit may also include, for example, the results of any computations that have been performed by either unit. This can then help ensure that consistent values are used by the different units, e.g. compared to having the results re-calculated, which may lead to inconsistencies as the ray tracing circuit (unit) and the programmable execution unit will typically perform the calculations differently (e.g. at different precisions and/or using different number formats (e.g. integer rather than floating point)). This may include for instance the result of any transforms that are calculated when moving between different ray tracing acceleration data structures.

Various other suitable information may of course be passed in the messages between the ray tracing circuit (unit) and the programmable execution unit, as desired. In an embodiment, where messages are sent back and forth between the ray tracing circuit (unit) and the programmable execution unit, the same message format is used for messaging in both directions. Other arrangements would however be possible.

The actual determination of the geometry, if any, that is intersected by a given ray can generally be performed in any suitable and desired manner.

However, in general, determination of the geometry, if any, that is intersected by a given ray involves performing a respective traversal of at least one ray tracing acceleration data structure, which traversal involves testing the ray for which the traversal is being performed for intersection with the respective volumes associated with the nodes of the ray tracing acceleration data structure to determine, with reference to the node volumes, which nodes potentially contain geometry that is intersected by the ray, and which nodes the traversal should accordingly visit next for further intersection testing of the ray.

Thus, as mentioned above, the ray tracing operation according to the technology described herein is performed using one or more ray tracing acceleration data structures. The ray tracing acceleration data structures that are used and traversed in the technology described herein can be any suitable and desired ray tracing acceleration data structures that are indicative of (that represent) the distribution of geometry for a scene to be rendered and that can be used (and traversed) to determine geometry for a scene to be rendered that may be intersected by a ray being projected into the scene.

The ray tracing acceleration data structure or structures in an embodiment represent (a plurality of) respective volumes within the scene being rendered and indicate and/or can be used to determine geometry for the scene to be rendered that is present in those volumes.

The ray tracing acceleration data structure(s) can take any suitable and desired form. In an embodiment the ray tracing acceleration data structure(s) comprise a tree structure, such as a bounding volume hierarchy (BVH) tree. In that case, the bounding volumes may be axis aligned (cuboid) volumes. Each end node may thus be associated with a respective bounding volume. The bounding volumes are then recursively clustered and wrapped in bounding volumes until a single root node is reached. At each level of the recursion two or more bounding volumes may be clustered into a single parent bounding volume. For instance, and in an embodiment, each non-leaf node has a corresponding plurality of child nodes. In an embodiment the ray tracing acceleration data structure used in the technology described herein comprises a 'wide' tree structure, in which each parent node may be (and in an embodiment is) associated with greater than two child nodes, such as three, four, five, six, or more, child nodes. In an embodiment each parent node may be associated with up to six child nodes.

However, other suitable ray tracing acceleration data structures may also be used, as desired. For instance, rather than using a BVH hierarchy, where the scene is subdivided by volume on a per-object basis, e.g. by drawing suitable bounding volumes around subsets of geometry, e.g., and in an embodiment, such that each leaf node (volume) corresponds to a certain number of objects (primitives), the scene could instead be subdivided on a per-volume basis, e.g. into substantially equally sized sub-volumes. For example, the ray tracing acceleration data structure may comprise a k-d tree structure, a voxel (grid hierarchy), etc., as desired. It would also be possible to use 'hybrid' ray tracing acceleration data structures where the scene is subdivided in part on a per-object basis and in part on a per-volume basis. Various other arrangements would be possible and the technology described herein may in general be used with any suitable ray tracing acceleration data structure.

Thus, in one embodiment, the ray tracing acceleration data structure comprises a bounding volume hierarchy, and in an embodiment a BVH tree. When there are multiple ray tracing acceleration data structures, in an embodiment each of these comprises a respective bounding volume hierarchy. However, it is also contemplated that multiple different types of ray tracing acceleration data structure may be defined to represent the distribution of geometry within a given scene.

At least one of the ray tracing acceleration data structures in an embodiment represents primitives (which may be triangles, or other suitable geometric objects) at its respective end (e.g. leaf) nodes. In that case, the primitives at the end nodes are wrapped in bounding volumes. Thus, if a ray intersects the bounding volume associated with an end node, this means that the ray potentially intersects the geometry encompassed within that bounding volume, and so the ray tracing process should continue to test the ray for intersection with the actual units of geometry to determine which geometry, if any, is actually intersected.

The ray tracing acceleration data structure can represent and be indicative of the distribution of geometry for a scene to be rendered in any suitable and desired manner. Thus it may represent the geometry in terms of individual graphics primitives, or sets of graphics primitives, e.g. such that each leaf node of the tree structure represents a corresponding subset of the graphics primitives defined for the scene that occupies the volume that the leaf node corresponds to.

Additionally or alternatively, the ray tracing acceleration data structure could represent the geometry for the scene in the form of higher level representations (descriptions) of the geometry, for example in terms of models or objects comprising plural primitives.

As mentioned above, it would also be possible for a given ray tracing acceleration data structure to represent the geometry in terms of indicating further ray tracing acceleration data structures that need to be analysed. In this case, an initial ray tracing acceleration data structure would, for example, represent further, e.g. finer resolution, ray tracing acceleration data structures that need to be considered for different volumes of the scene, with the traversal of the initial ray tracing acceleration data structure then determining a further ray tracing acceleration data structure or structures that need to be traversed depending upon which volumes for the scene the ray in question intersects.

Thus the ray tracing traversal operation could include transitions between different ray tracing acceleration data structures, such as transitions between different levels of detail (LOD), and/or between different levels of multi-level ray tracing acceleration data structures.

There may also be ray transformations between ray tracing acceleration data structure switches (e.g. such that there is an automatic transition between different ray tracing acceleration data structures with and/or using a transformation of the ray, e.g. described by metadata of or associated with the ray tracing acceleration data structure). For example, a transition between different levels of detail could use an identity transform, and transitions between multi-level ray tracing acceleration data structures could use generic affine transformations of the rays. (As briefly mentioned above, in such cases, the ray tracing circuit (unit) is in an embodiment configured to calculate such transforms itself (using appropriate, e.g., and in an embodiment, dedicated, circuitry (circuit) to do so), and the messages that are exchanged between the ray tracing circuit (unit) and the programmable execution unit are in an embodiment then configured to indicate the results of such calculations to save this having to be re-calculated by the different units (with potentially inconsistent results.))

Various arrangements would be possible in that regard.

The ray tracing acceleration data structure that is traversed can be generated and provided in any suitable and desired manner. For example, it may be previously determined and provided, e.g., as part of the definition of the scene to be rendered by the application that requires the graphics processing.

In an embodiment, the ray tracing acceleration data structure is generated by the graphics processor itself, e.g. based on an indication of geometry for the scene that is provided to the graphics processor, e.g. in a preliminary processing pass before the scene is rendered.

It could also or instead be generated by a CPU (e.g. host processor), e.g. based on an indication of geometry for the scene, e.g. in a preliminary processing pass before the scene is rendered.

Other arrangements would, of course, be possible.

Subject to the particular requirements of the technology described herein, the traversal operation can traverse the ray tracing acceleration data structure or structures for a ray in any suitable and desired manner, e.g., and in an embodiment in dependence upon the form of the ray tracing acceleration data structure that is being traversed. The traversal operation will use the information provided about the ray to traverse the ray tracing acceleration data structure or structures to determine geometry for the scene to be rendered that may be intersected by the ray in question.

For instance, as mentioned above, the traversal operation for a given ray generally comprises traversing at least one ray tracing acceleration data structure and testing the ray for intersection with the respective volumes and/or geometry associated with the respective nodes of the ray tracing acceleration data structure or structures that are being traversed (with the type of testing that is performed depending on the type of node being tested).

Thus, the traversal process in an embodiment operates to traverse the ray tracing acceleration data structure or structures to determine for each volume of the scene that the ray passes through in turn, whether there is any geometry in the volume (indicated by the ray tracing acceleration data structure). Thus, the ray tracing acceleration data structure will be traversed based on the position and direction of the ray, to determine whether there is any geometry in the volumes of the scene along the path of the ray (which could, accordingly, then potentially be intersected by the ray). Other arrangements would, of course, be possible.

In particular, the traversal process involves, for a ray that is being used for the ray tracing process, testing the ray for intersection with one or more (child node) volumes associated with a node of the ray tracing acceleration data structure to determine which of the associated volumes (i.e. child nodes) is intersected by the ray. The traversal process then comprises subsequently testing the ray for intersection with the volumes associated with the (child) node in the next level of the ray tracing acceleration data structure, and so on, down to the lowest level (end, e.g. 'leaf') nodes. Once the traversal process has worked through the ray tracing acceleration data structure, by performing the required ray-volume intersection testing for the nodes to determine which volumes (represented by end/leaf nodes) contain geometry that may be intersected by the ray, the ray can then be further tested to determine the actual (ray-primitive) intersections with the geometry defined within those volumes (and only within those volumes) (with any intersected geometry then being shaded appropriately).

Thus, in an embodiment, the traversal is performed by first testing a root node at the top of a first ray tracing acceleration data structure and determining whether or not the ray intersects the respective volumes for any child nodes of that root note. If so, the traversal then proceeds to test the ray in turn against the child nodes that were found to be intersected, and then against any child nodes of the child nodes that are found to be intersected, and so on, down to the end nodes at the lowest level of the first ray tracing acceleration data structure.

A suitable traversal record is thus in an embodiment maintained to track and manage which nodes should be tested during the traversal operation. The traversal record thus in an embodiment includes as entries indications of which nodes of the ray tracing acceleration data structure should be tested (i.e. which nodes have volumes for which it has been determined that are intersected by the ray performing the traversal operation).

The traversal record may generally take any suitable form, e.g. as may suitable be used for managing such ray tracing traversal operations, but in an embodiment comprises a traversal 'stack'.

Thus, during the traversal operation for a ray, when (and whenever) it is determined by an instance of ray-volume testing that a (child) node represents a subset of geometry that may be intersected by the ray performing the traversal operation, an indication of, e.g. pointer to, the node is then included into (e.g. pushed to) the traversal record for that ray so that the entry can subsequently be read out (popped) from the traversal record to cause the ray to be tested against that node, accordingly, and so on.

The traversal record can then be worked through with the record entries being read out (popped) accordingly to determine which nodes to be next tested. In the case of a traversal stack, this is in an embodiment managed using a 'last-in-first-out' scheme with the node intersections being pushed to/popped from the stack appropriately. However, various arrangements would be possible in that respect.

The ray tracing circuit (unit) thus in an embodiment maintains a respective traversal record (e.g., and in an embodiment, in the form of a traversal 'stack', as described above) for each ray that is performing a traversal, with the traversal record indicating which node(s) should be visited next as part of the traversal. The traversal then proceeds accordingly by visiting the nodes according to the order they are listed in the record. In this respect, it will be appreciated that the nodes may be added to the traversal record in any suitable and desired order. Various arrangements are contemplated in that regard. For example, it may be more efficient to prioritise testing of end nodes over internal nodes. However, other examples would of course be possible.

The traversal record (stack) for a ray is thus in an embodiment initialised when the ray is created at the ray tracing circuit (unit). Thus, in response to the ray tracing circuit (unit) receiving a message from the programmable execution unit to perform a geometry intersection determination in respect of a ray, the ray tracing circuit (unit) in an embodiment then creates the rays that are to be processed (as described above), and then initialises a respective traversal record (stack) for each respective ray that is to be processed. That is, in an embodiment, each ray has its own respective individual traversal record (stack) (e.g. rather than trying to maintain an overall traversal record for plural rays together).

The traversal record (stack) is in an embodiment then managed (entirely) via the ray tracing circuit (unit), in an embodiment without writing the traversal record (stack) to memory (other than in the event of overflow, for example).

Thus, when (the processing of) a ray needs to be returned to the programmable execution unit to execute a shader routine before the ray tracing circuit (unit) has completed processing the ray (e.g. to execute an intersection or 'any-hit' shader, as mentioned above), the current state of traversal record (stack) is in an embodiment discarded at this point (e.g., and in an embodiment, without saving it to memory), such that, as explained above, when the ray is passed back to the ray tracing circuit (unit) to resume its traversal, the traversal is resumed from the start, e.g. from the root node at the top of the respective acceleration data structure that the ray is to traverse, with a new traversal record (stack) being created to manage the resumed traversal.

The traversal operation is then performed accordingly. For example, when the testing of a ray against a given node indicates that one or more other (e.g. child) node volumes associated with the node are intersected by the ray, the intersected (child) nodes can then be (and in an embodiment are) added to the traversal record accordingly, such that the traversal continues by subsequently visiting and testing those nodes, and so on, until it is determined that the ray intersects a node volume representing actual geometry (in which case the ray should then be, and in an embodiment is, tested against the respective units of geometry to determine whether or not the geometry is in fact intersected), or conversely until it can be determined that the ray does not intersect any geometry (i.e. there is a "miss").

In some embodiments, the traversal operation traverses the ray tracing acceleration data structure or structures for the path of the ray until a first (potential) intersection with geometry defined for the scene is found for the ray. However, it would also be possible to continue traversal of the ray tracing acceleration data structure after a first (potential) intersection has been found for a ray, if desired.

For example, the ray traversal operation could be (and in an embodiment is) configured and able to discard (ignore) a (potential) intersection and to carry on with the traversal, e.g. depending upon the properties of the geometry for the intersection in question. For example, if a (potentially) intersected geometry is fully or partially transparent, it may be desirable to continue with the traversal (and either discard or retain the initial "transparent" intersection).

Other arrangements would, of course, be possible. For instance, as described above, in other embodiments if a (potentially) intersected geometry is fully or partially transparent, the ray tracing circuit (unit) may be, and in some embodiments is, configured to stop the traversal and return the ray to the programmable execution unit to execute an appropriate intersection shader to determine whether the ray actually intersects the geometry, or not, and how the traversal should continue.

The ray tracing acceleration data structure traversal for a ray could comprise traversing a single ray tracing acceleration data structure for the ray, or traversing plural ray tracing acceleration data structures for the ray. Plural ray tracing acceleration data structures may be traversed for a ray e.g. in the case where the overall volume of, and/or geometry for, the scene is represented by plural different ray tracing acceleration data structures.

Thus, in an embodiment the ray tracing acceleration data structure traversal operation for a ray comprises traversing plural ray tracing acceleration data structures for the ray, to thereby determine geometry for the scene to be rendered that may be intersected by the ray.

For instance, as discussed above, in an embodiment, a ray tracing acceleration data structure that indicates further ray tracing acceleration data structures to be traversed is used. In this case therefore the ray tracing acceleration data structure traversal circuit will operate to first traverse an initial ray tracing acceleration data structure for the ray to determine one or more further ray tracing acceleration data structures to be traversed for the ray, and to then traverse those determined one or more ray tracing acceleration data structures for the ray, and so on, until an "end" ray tracing acceleration data structure or structures that provides an indication of geometry for the scene to be rendered is traversed for the ray.

Various other arrangements would be possible in this respect.

When performing a traversal of an acceleration data structure, the ray tracing circuit (unit) thus tests the ray against the nodes of the acceleration data structure to determine how the traversal should continue. To do this, the ray tracing circuit (unit) thus needs to obtain the relevant node data for the respective nodes of the ray tracing acceleration data structure or structures that are being traversed.

The node data is in an embodiment stored in a certain location in memory, e.g. in external (e.g. main) memory. Thus, the ray tracing circuit (unit) is in an embodiment operable to fetch in node data, when required, from its location in memory, and then perform the required intersection testing against the node data as part of the traversal operation.

As mentioned above, the ray tracing circuit (unit) thus in an embodiment has an interface to external memory. The ray tracing circuit (unit) in an embodiment also comprises local storage, e.g. in the form of a cache, in which the node data can be stored locally to the graphics processor. Thus, in embodiments, memory access is performed via a cache system that is accessible by the ray tracing circuit (unit) (this may, for example, comprise the graphics processor's load/store cache).

Thus, when a given ray requires data for a certain node (e.g. the respective child node volumes, or the respective set of geometry, encompassed by the node in question) as part of its traversal, a request for the node data is in an embodiment made via such local storage (e.g. via the cache system) (when present). If the node data is already available in local storage, the requested data can then be read from there. Otherwise, the ray may need to wait until the node data is available. In that case, the ray's traversal may need to be paused until the node data has been fetched in to local storage.

The result of the traversal for a ray is thus to first determine with reference to the respective node volumes for the nodes of the ray tracing acceleration data structure or structures being traversed which geometry, if any, is potentially intersected by the ray. Once it has been determined that a ray potentially intersects geometry represented by a given end node of a ray tracing acceleration data structure, the ray tracing circuit (unit) then proceeds to determine whether the geometry represented by the end node is actually intersected (or not).

The actual intersection testing itself can be performed in any suitable and desired manner, e.g. in the normal way for ray tracing operations (except that it is now managed by the novel ray tracing circuit (unit) of the technology described herein that is configured to do this).

As described above, there are various options for how the traversal operation may then proceed, e.g. in dependence on which geometry, if any, is determined to be intersected by the ray for which the traversal operation is being performed.

For example, if the ray tracing circuit (unit) can determine that the ray intersects opaque geometry, this can then be recorded, and used to update the record of 'closest-hit' geometry, if appropriate, and the traversal operation can then continue to test the next unit of geometry associated with that end node (or the next node that is listed to be tested in the traversal record) accordingly. Once all of the geometry has been considered and the final determination of the 'closest-hit' geometry made, this result can then be recorded accordingly, and a corresponding "closest-hit" shader routine then executed to render the sampling position(s) associated with the ray accordingly, e.g. as described above.

On the other hand, if the ray tracing circuit (unit) determines that the ray intersects non-opaque (e.g. transparent) geometry, or other geometry that cannot be handled by the ray tracing circuit (unit) itself, in that case, as described above, the ray tracing circuit (unit) may need to return the ray to the programable execution unit immediately, such that the ray tracing circuit (unit) is in an embodiment configured to terminate the current traversal operation and return the ray to the programmable execution unit to execute a required shader program. In that case, the traversal is in an embodiment subsequently resumed, e.g., and in an embodiment from the start.

Correspondingly, if the ray tracing circuit (unit) determines that the ray does not in fact intersect any geometry within the scene, this result can be recorded accordingly, and a corresponding "miss" shader routine may then be executed for that ray, e.g. as described above.

In an embodiment, once the traversal operation for a ray is completed, the ray tracing circuit (unit) then writes the result of the traversal operation to memory, in an embodiment also writing any updated ray parameters (e.g. if the ray has been shortened), in a single memory write. In an embodiment, after the initial loading in of the ray data by the programmable execution unit at the start of the program execution, the ray data (and any other information about the progress or result of the traversal for that ray) is then managed by the ray tracing circuit (unit), and any such information is then in an embodiment then passed between the ray tracing circuit (unit) and the programmable execution unit by sending suitable messages (rather than via memory), with the data in some embodiments only being written back to memory by the ray tracing circuit (unit) once the entire traversal operation is completed.

The technology described herein particularly relates to the situation where a frame that represents a view of a scene comprising one or more objects is being rendered using a ray tracing process.

In this process, the frame that is being rendered may, and in an embodiment does, comprise an array of sampling positions, and a ray tracing process will be used to render each of the sampling positions so as to provide a rendered output. For example, the rendered output may comprise a frame (e.g. an image) that represents the desired view of the scene (with respective rays that are cast corresponding to and being used when rendering and to render respective sampling positions for the frame).

In general, however, the rendered output may be any suitable output that may be generated by a graphics processor, as desired, and need not represent graphics (e.g. image) data, but may for example represent any suitable image or non-image output that a graphics processor may generate, either when performing graphics processing work, or when being used in a more general purpose manner.

The technology described herein can be used for any form of ray tracing based rendering.

Thus, for example, the technology described herein can be used for and when a "full" ray tracing process is being used to render a scene, i.e. in which so-called "primary" rays are cast from a view point (the camera) through a sampling position in the image frame to determine the intersection of that ray with objects in the scene, e.g., and in an embodiment, to determine, for each ray, a closest object in a scene that the ray intersects (a "first intersection point" of the ray). The process may involve casting further (secondary) rays from the respective first intersection points of primary rays with objects in the scene, and additionally using the intersection data for the secondary rays in determining the rendering of the sampling positions.

In this case, the operation in the manner of the technology described herein may be, and is in an embodiment, used when and for analysing the intersections of both primary and secondary rays with objects in the scene.

The technology described herein can also be used for so-called "hybrid" ray tracing rendering processes, e.g. in which both ray tracing and rasterisation processes are performed when performing rendering (e.g. in which only some of the steps of a full ray tracing process are performed, with a rasterisation process or processes being used to implement other steps of the "full" ray tracing process). For example, in an exemplary hybrid ray tracing process, the first intersection of each of the primary rays with objects in the scene may be determined using a rasterisation process, but with the casting of one or more further (secondary) rays from the determined respective first intersection points of primary rays with objects in the scene then being performed using a ray tracing process.

In this case, the operation in the manner of the technology described herein may be, and is in an embodiment, used when and for analysing the intersections of the secondary rays with objects in the scene.

Subject to the particular operation in the manner of the technology described herein, the execution of the shader program to perform the desired ray tracing process can otherwise be performed in any suitable and desired manner, such as, and in an embodiment, in accordance with the execution of shader programs in the graphics processor and graphics processing system in question.

Thus, the graphics processor (the programmable execution unit of the graphics processor) will operate to execute the shader program(s) that includes a sequence of instructions to perform the desired ray tracing rendering process, for plural, and in an embodiment for each, sampling position, of the frame that is to be rendered.

Correspondingly, when executing the ray tracing shader program, the graphics processor will operate to spawn (issue) respective execution threads for the sampling positions of the frame being rendered, with each thread then executing the program(s) so as to render the sampling position that the thread represents (and corresponds to). The graphics processor accordingly in an embodiment comprises a thread spawner (a thread spawning circuit) operable to, and configured to, spawn (issue) execution threads for execution by the programmable execution unit.

The ray tracing rendering shader program(s) that is executed by the programmable execution unit can be prepared and generated in any suitable and desired manner.

In an embodiment, it or they is generated by a compiler (the shader compiler) for the graphics processor of the graphics processing system in question (and thus the processing circuit that generates the shading program in an embodiment comprises an appropriate compiler circuit). The compiler is in an embodiment executed on an appropriate programmable processing circuit of the graphics processing system.

In a graphics processing system that is operable in the manner of the technology described herein, in embodiments of the technology described herein at least, a compiler, e.g. executing on a host processor, will generate and issue to the graphics processor one or more shader programs that when executed will perform the required ray tracing-based rendering operations in accordance with the technology described herein, with the graphics processor (the programmable execution unit of the graphics processor) then executing the programs to perform the ray tracing-based rendering, and as part of that program execution exchanging the messages discussed above with the ray tracing circuit (unit) of the graphics processor.

Thus, a graphics shader program or programs, including a set (sequence) of program instructions that when executed will perform the desired ray tracing rendering process, will be issued to the graphics processor and executed by the programmable execution unit. The shader program(s) may include only instructions necessary for performing the particular ray tracing based rendering operations, or it may also include other instructions, e.g. to perform other shading operations, if desired.

As described above, the particular operation of the technology described herein can be (and is) implemented and triggered by including appropriate 'ray tracing' instructions in the ray tracing rendering shader program to be executed by the programmable execution unit that will trigger the programmable execution unit to send an appropriate message to the ray tracing circuit (unit) to trigger the desired traversals of the ray tracing acceleration data structure or structures to be traversed for the ray(s) in question to be performed and to thereby determine the geometry, if any, that is intersected by the ray or rays for which this operation is triggered (with the programmable execution unit then sending the message when it reaches (executes) the relevant instruction in the shader program).

Such instructions can be included in a shader program to be executed by the programmable execution unit in any suitable and desired manner and by any suitable and desired element of the overall data (graphics) processing system.

For instance, in an embodiment, the 'ray tracing' instruction (or set of instructions) is included in the shader program by the compiler (the shader compiler) for the graphics processor. Thus the compiler in an embodiment inserts a set of one or more ray tracing instructions at the appropriate point in the ray tracing rendering shader program that is performing the ray tracing.

In an embodiment, a 'ray tracing' (acceleration) instruction is included in the ray tracing rendering shader program that is to be executed by the graphics processor by the compiler in response to an appropriate ray tracing indication (e.g. a "trace( )" call), included in the (high level) shader program that is provided by the application that requires the graphics processing. Thus, e.g., and in an embodiment, an application program will be able to include an explicit indication of a need for a traversal operations to be performed, with the compiler then, in the technology described herein, including an appropriate 'ray tracing' (acceleration) instruction in the compiled shader program in response to that. It may also be possible for the compiler to include a 'ray tracing' (acceleration) instruction of its own accord, e.g. in the case where the compiler is able to assess the shader program being compiled to identify when and where to include a 'ray tracing' (acceleration) instruction or instructions, even in the absence of an explicit indication of that.

In an embodiment, the compiler analyses the shader program code that is provided, e.g. by the application on the host processor that requires the graphics processing, and includes a ray tracing acceleration instruction or instructions at the appropriate point(s) in the shader program (e.g. by inserting the instruction(s) in the (compiled) shader program).

When executing the shader program to perform the ray tracing based rendering process, as it is a ray tracing-based rendering process, the performance of that process will include the tracing of rays into and through the scene being rendered, e.g., and in an embodiment, so as to determine how a given sampling position that the ray or rays in question correspond to should be rendered to display the required view of the scene at that sampling position.

Accordingly, the determination of which geometry, if any, is intersected by the rays is then used by graphics processor to continue the processing (ray tracing/rendering) operations.

For instance, the operations described above can then be (and are) repeated for other groups of rays for the sampling position, and once this is done, the sampling position can then be rendered accordingly, e.g. in the usual way for ray tracing operations.

For any geometry (primitives) that is it determined is actually intersected by a ray, various processing steps can then be taken to determine the effect (e.g. appearance) this should have in the sampling position for which the ray was cast.

Thus, once the geometry that the rays will actually intersect (if any) has been determined, then the programmable execution unit performs further processing for the sampling positions in the frame that the rays correspond to in accordance with the (any) geometry for the scene determined to be intersected by the ray.

The further processing for a sampling position that is performed in this regard can comprise any suitable and desired processing for the sampling position as a result of the ray tracing operation for the ray in question, e.g., and in an embodiment, in accordance with and based on any geometry for the scene that was determined to be intersected by the ray.

As described above, the further processing that is performed is in an embodiment controlled by executing an appropriate shader program routine that is in an embodiment determined and selected in accordance with and based on the geometry of the scene that was determined to be intersected by the ray, and/or in accordance with and based on the particular ray tracing-based rendering process that is being performed (e.g. whether the ray tracing process requires the casting of secondary rays (where it is appropriate to do that), and/or the casting of secondary rays of a particular type, or whether the ray tracing-based rendering is intended to be based solely on the first intersection point that is determined). For example, the further processing could be, and in an embodiment is, based on the determined surface type of the geometry that is intersected, and a predefined operation (e.g. in terms of the casting of any secondary rays) for that surface type.

Other arrangements would, of course, be possible.

Thus, in an embodiment, the further processing for a sampling position that can be (and is) performed in accordance with any geometry for the scene determined to be intersected by a ray corresponding to the sampling position comprises triggering the casting of a further (e.g. secondary) ray into the scene for the sampling position in question, and a corresponding shader program routine may be selected to control this further processing.

However, the further processing for a sampling position in the frame that a ray corresponds to that can be (and is) performed in accordance with any geometry for the scene determined to be intersected by the ray also or instead (and in an embodiment also) comprises rendering (shading) the sampling position for the frame to generate an output data value (colour value) for the sampling position, e.g., and in an embodiment, to be used to display the view of the scene at the sampling position for the frame in question.

Various arrangements would be possible in this regard.

Thus, in an embodiment, the further processing for a sampling position in a frame that a ray corresponds to that is performed comprises one of:

triggering the tracing (casting) of a further (e.g. secondary) ray for the sampling position in question; and rendering (shading) the sampling position so as to provide an output colour value for the sampling position for the frame.

Correspondingly, the technology described herein in an embodiment comprises returning a ray to the programmable execution unit to execute an appropriate shader program routine for further processing the ray, wherein the further processing comprises shading the sampling position based on the intersection and/or casting further rays into the scene based on the intersection.

The rendering (shading) of the sampling position can be performed in any suitable and desired manner and this is in an embodiment determined, in part, by the ray tracing circuit (unit), e.g. by the ray tracing circuit (unit) determining the appropriate shader program routine that should be executed for the ray or rays that it is processing.

In an embodiment, it is performed based on and in accordance with the results of the casting of the ray or rays for the sampling position, and the determined intersected geometry (if any), and/or based on and in accordance with the particular ray tracing-based rendering process that is being performed. For example, the rendering (shading) processing could be, and in an embodiment is, based on the determined surface type of the geometry that is intersected, and a predefined shading operation for that surface type.

The rendering (shading) in an embodiment takes account of all the rays that have been cast for a sampling position and so in an embodiment is based both on the first intersected geometry (and the properties, e.g. surface properties, of that geometry), together with the result of any further (secondary) rays that have been cast for the sampling position, e.g. to determine any lighting, reflection or refraction effects.

Other arrangements would, of course, be possible.

In an embodiment, the rendering (shading) of the sampling position is performed once all of the (desired) rays have been cast for the sampling position (and the geometry intersections (if any) for all of the rays to be cast for the sampling position in question have been determined). (As discussed above, the ray tracing process for a given sampling position may comprise both the determination of any geometry that is intersected by a "primary" ray that has been cast from the sampling position itself, together with the determination of geometry, etc., for any secondary rays that have been cast for the sampling position in question, e.g. as a result of an intersection or intersections determined for the primary ray.)

Thus, in an embodiment, once the final results of the rays (the geometry intersections (if any)) have been determined for a sampling position, the programmable execution unit will then render the sampling position in the frame, (at least) in accordance with any geometry for the scene determined to be intersected by rays that have been cast for the sampling position.

Again, this can be done in any suitable and desired manner, and can use any suitable and desired properties, etc., of the geometry, etc., that is determined to be intersected by a ray or rays for the sampling position.

Once the ray tracing based rendering process has been completed for a sampling position, then that will, and in an embodiment does, as discussed above, generate an appropriate set of output data for the sampling position, e.g., and in an embodiment, in the form of an appropriate set of colour (e.g. RGB) data, for the sampling position.

This will be done for each sampling position in the frame (thus the operation in the manner of the technology described herein is in an embodiment performed for plural, and in an embodiment for each, sampling position of the frame being rendered), so that a final output frame showing a view of the scene to be rendered will be generated, which output frame can then, e.g., be written out to memory and/or otherwise processed for further use, e.g. for display on a suitable display.

The process may then be repeated for a next frame (e.g. the next frame to be displayed), and so on.

Subject to the particular requirements of the technology described herein, the graphics processor can be any suitable and desired graphics processor that includes a programmable execution unit (circuit) that can execute program instructions.

As mentioned above, the graphics processor in the technology described herein also includes a novel ray tracing circuit (unit) that is configured to, and operable to, determine for a ray that has been passed to the ray tracing circuit (unit) the geometry, if any, that is intersected by the ray.

The ray tracing circuit (unit) of the graphics processor should be, and is in an embodiment, a (substantially) fixed-function hardware unit (circuit) that is configured to perform the ray tracing operations according to the technology described herein. The ray tracing circuit (unit) should thus comprise an appropriate fixed function circuit or circuits to perform the required operations, although it may comprise and have some limited form of configurability, in use, e.g. if desired.

There may be a single or plural ray tracing circuits (units), e.g. such that plural programmable execution units share a given (or a single) ray tracing circuit (unit), and/or such that a given programmable execution unit has access to and can communicate with and use plural different ray tracing circuits (units). Where there are plural ray tracing circuits (unit), each such circuit can in an embodiment operate in the manner of the technology described herein.

The ray tracing circuit (unit) (or circuits/units) should also, and in an embodiment does, have a suitable messaging interface for communicating with the programmable execution unit of the graphics processor as required.

Thus, in the technology described herein, during the ray tracing operation, when the overall ray tracing operation requires a determination of the geometry, if any, that is intersected by a given ray (or group of rays), the programmable execution unit in an embodiment triggers an ray tracing circuit (unit) to perform the desired (ray-volume) intersection testing for the ray or rays in question.

The communication between the ray tracing circuit (unit) (s), etc., and the programmable execution unit can be facilitated as desired. There is in an embodiment an appropriate communication (messaging) network for passing messages between the various units. This communication (messaging) network can operate according to any desired communications protocol and standard, such as using a suitable interconnect/messaging protocol.

When the programmable execution unit requires the ray tracing circuit (unit) to perform a geometry intersection determination operation, the programmable execution unit in an embodiment therefore sends a message to that effect to the ray tracing circuit (unit), as described above.

As well as the ray tracing circuit (unit), there may also be other accelerators (special purpose units) that are able to communicate with the programmable execution unit, such as a load/store unit (circuit), an arithmetic unit or units (circuit (s)), a texture mapper, etc., if desired.

The technology described herein can be used for all forms of output that a graphics processor may output. Thus, it may be used when generating frames for display, for render-to-texture outputs, etc. The output from the graphics processor is, in an embodiment, exported to external, e.g. main, memory, for storage and use.

Subject to the requirements for operation in the manner of the technology described herein, the graphics processor can otherwise have any suitable and desired form or configuration of graphics processor and comprise and execute any other suitable and desired processing elements, circuits, units and stages that a graphics processor may contain, and execute any suitable and desired form of graphics processing pipeline.

In an embodiment, the graphics processor is part of an overall graphics (data) processing system that includes, e.g., and in an embodiment, a host processor (CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The overall graphics processing system may, for example, include one or more of: a host processor (central processing unit (CPU)), the graphics processor (processing unit), a display processor, a video processor (codec), a system bus, and a memory controller.

The graphics processor and/or graphics processing system may also comprise, and/or be in communication with, one or more memories and/or memory devices that store the data described herein, and/or the output data generated by the graphics processor, and/or store software (e.g. (shader) programs) for performing the processes described herein. The graphics processor and/or graphics processing system may also be in communication with a display for displaying images based on the data generated by the graphics processor.

The technology described herein also extends to an overall graphics processing system and the operation of that system.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuitry/circuits), and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages, etc., may share processing circuitry/circuits, etc., if desired.

The various circuitry, functional elements, stages, units, and "means" of the technology described herein may comprise a suitable processor or processors, controller or controllers, functional units, circuitry, circuits, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display processor, or microprocessor system comprising a data processor causes in conjunction with said data processor said controller or system to carry out the steps of the methods of the technology described herein. Such a computer software carrier could be a physical storage intermediate such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory intermediate, such as a computer readable intermediate, for example, diskette, CD ROM, ROM, RAM, flash memory, or hard disk. It could also comprise a series of computer readable instructions transmittable to a computer system, via a modem or other interface device, over either a tangible intermediate, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable intermediate with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of objects within the scene which a ray passing through the sampling position intersects.

Figure 2:
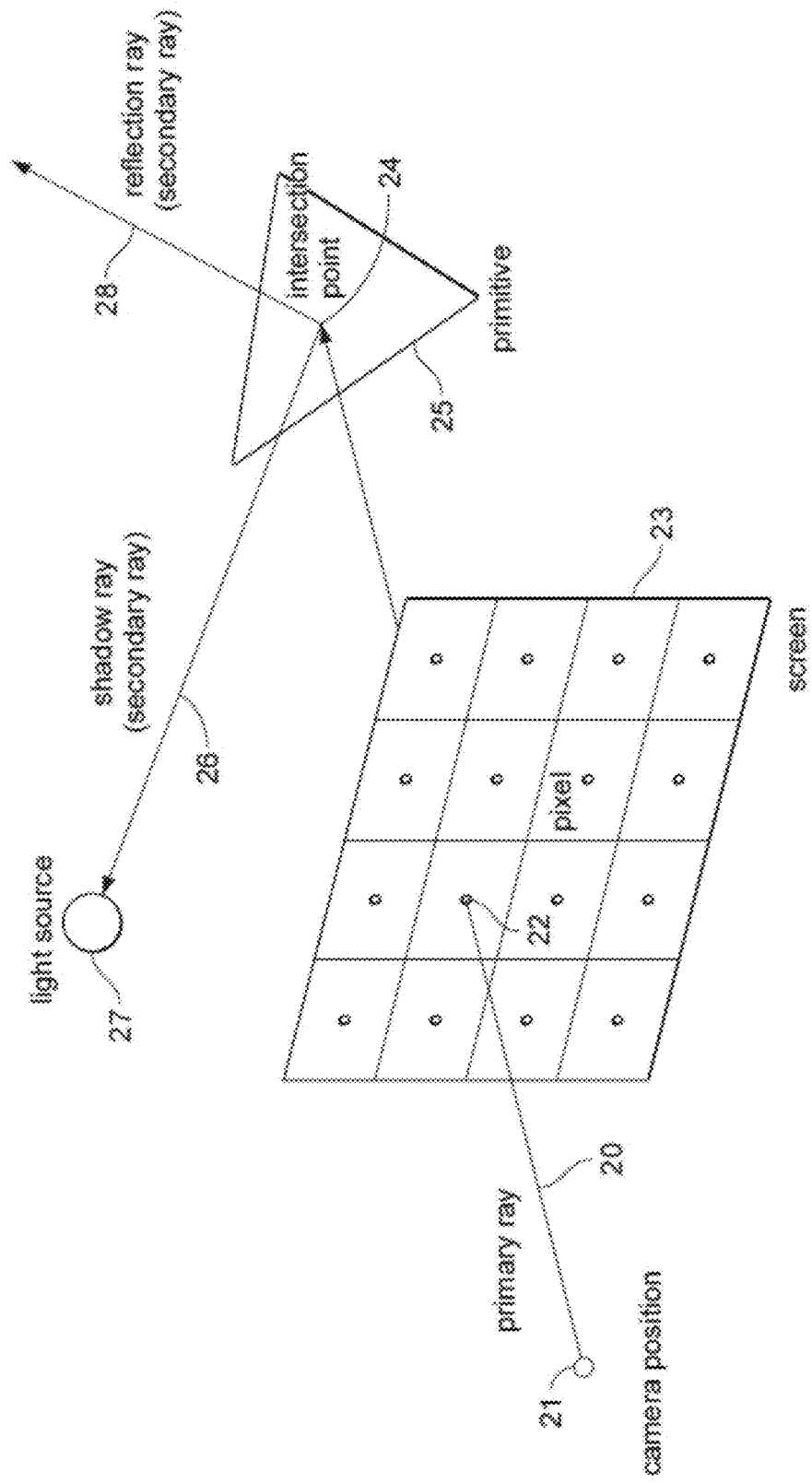
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object 25, e.g. a primitive (which primitives in the present embodiments are in the form of triangles, but may also comprise other suitable geometric shapes), in the scene is identified. This first intersection will be with the object in the scene closest to the sampling position.

A secondary ray in the form of shadow ray 26 may be cast from the first intersection point 24 to a light source 27. Depending upon the material of the surface of the object 25, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered). In the present embodiments, ray tracing acceleration data structures in the form of Bounding Volume Hierarchy (BVH) trees are used.

Figure 3:
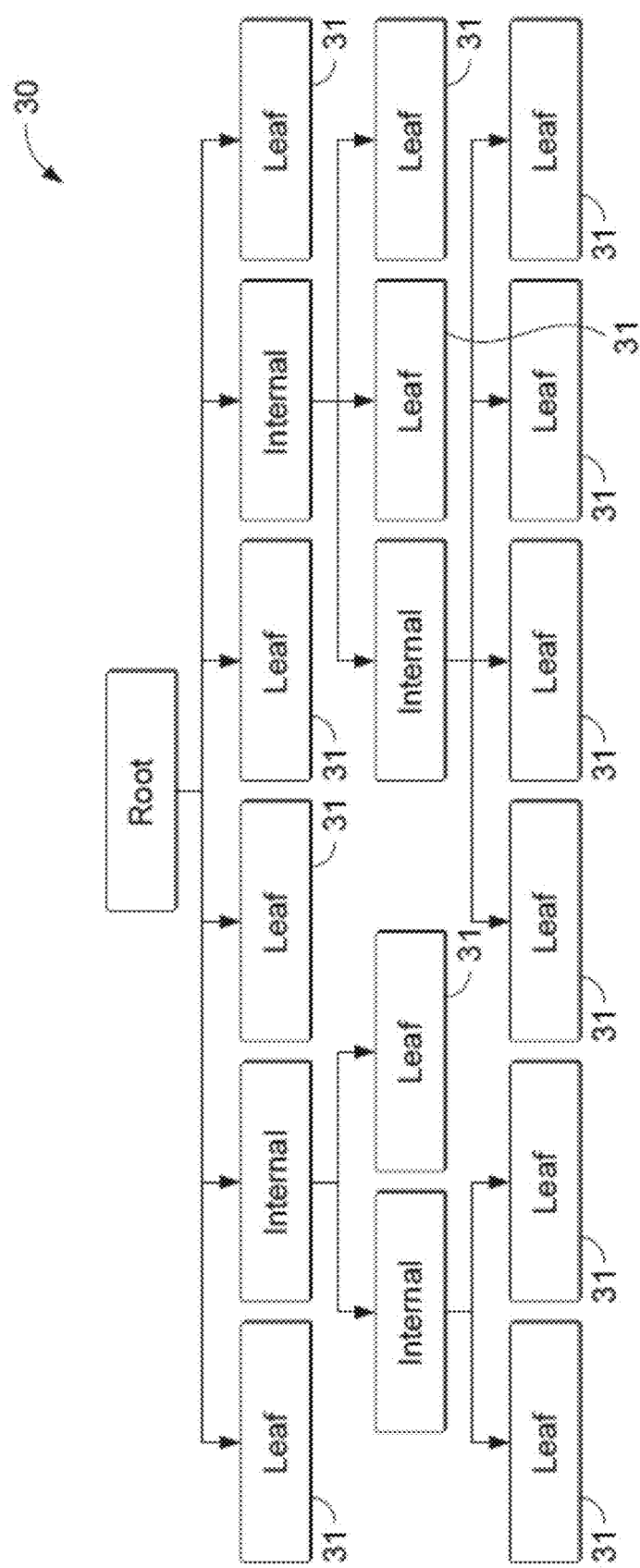
FIG. 3 shows an exemplary ray tracing acceleration data structure.

FIG. 3 shows an exemplary BVH tree 30, constructed by enclosing a volume in an axis-aligned bounding volume (AABV), e.g. a cube, and then recursively subdividing the bounding volume into successive sub-AABVs according to any suitable and desired subdivision scheme, until a desired smallest subdivision (volume) is reached.

In this example, the BVH tree 30 is a relatively "wide" tree wherein each bounding volume is subdivided into up to six sub-AABVs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest subdivided volume, and any parent node representing, and being associated with, the volume of its child nodes.

A complete scene may be represented by a single BVH tree, e.g. with the tree storing the geometry for the scene in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 4:
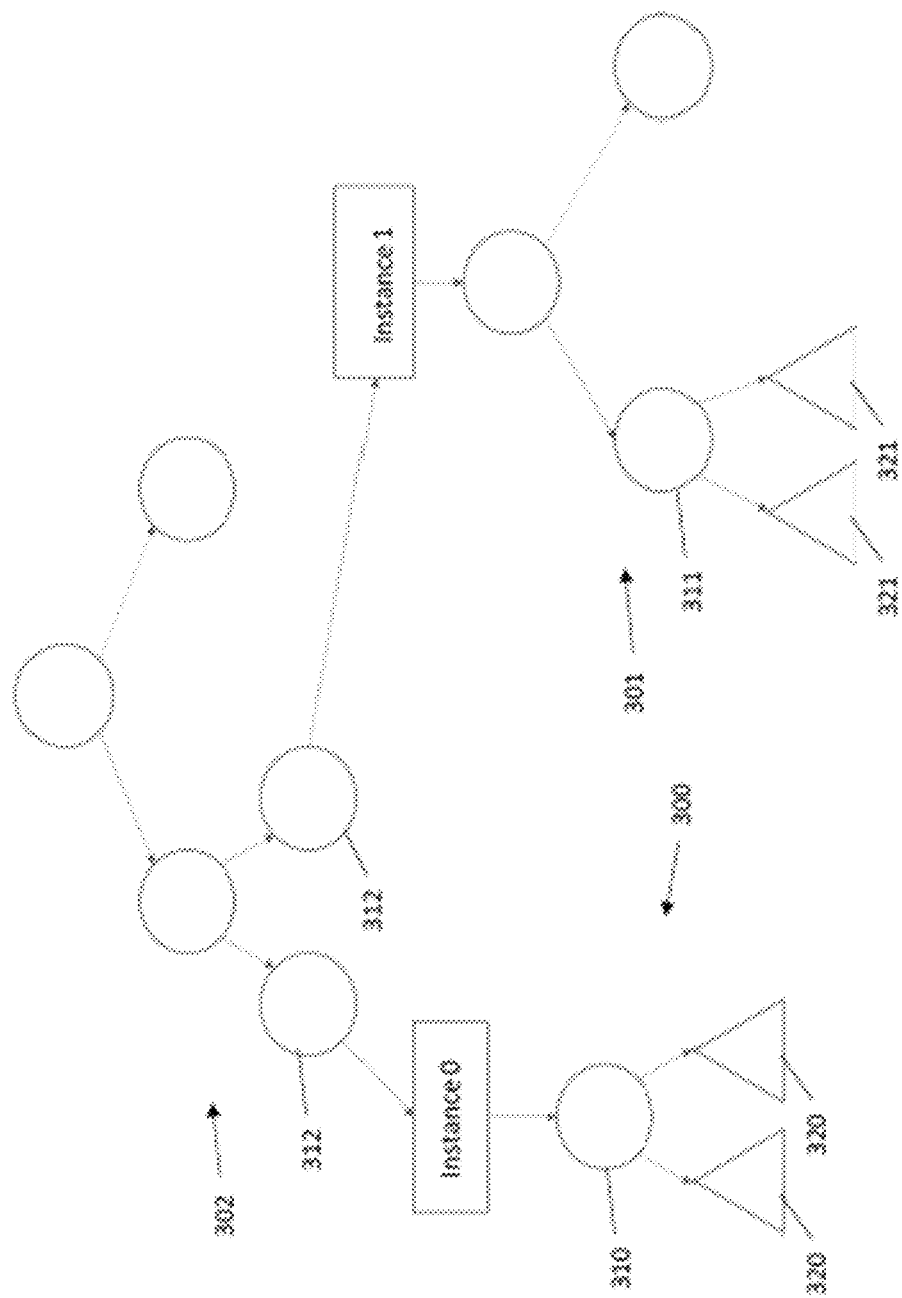
FIG. 4 shows in more detail an exemplary multi-level arrangement of ray tracing acceleration data structures that may be used according to an embodiment of the technology described herein.

In the present embodiments, a two-level arrangement of ray tracing acceleration data structures is used to represent the distribution of geometry within the scene to be rendered. FIG. 4 shows an exemplary two-level arrangement of ray tracing acceleration data structures in which each instance or object within the scene is associated with a respective bottom-level acceleration structure (BLAS) 300, 301, which in the present embodiments is in the form of a respective BVH tree that stores geometry in model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in world space and is in the form of a BVH tree having leaf nodes 312 that each point to one or more of the bottom-level acceleration structures (BLAS) 300, 301.

The BVH tree acceleration data structure also stores (either for the nodes themselves or otherwise, e.g. as sideband information), appropriate information to allow the tree to be traversed volume-by-volume on the basis of the origin and direction of a ray so as to be able to identify a leaf node representing a volume that the ray passes through.

This then allows and facilitates testing a ray against the hierarchy of bounding volumes in the BVH tree until a leaf node is found. It is then only necessary to test the geometry associated with the particular leaf node for intersection with the ray.

Other forms of ray tracing acceleration data structure would be possible.

Figure 5:
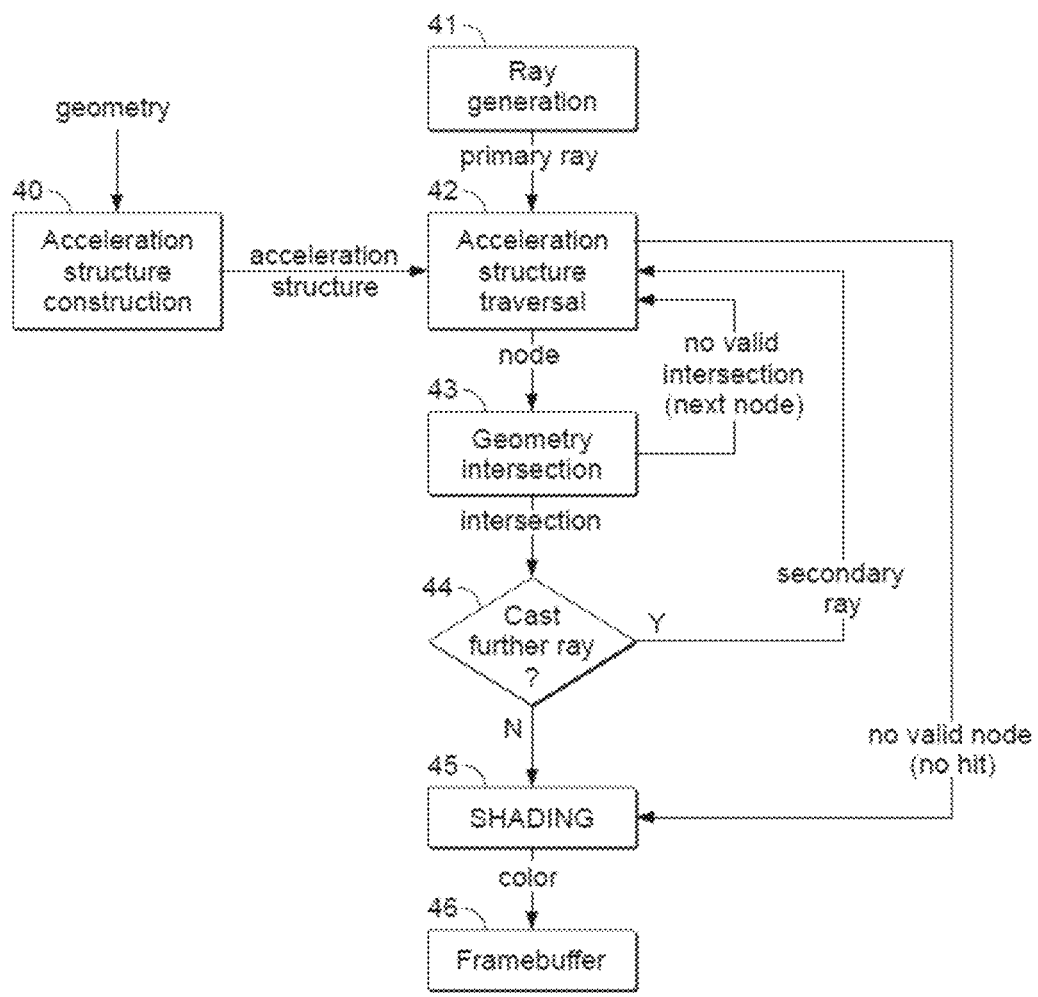
FIG. 5 is a flow chart illustrating an embodiment of a full ray tracing process.

FIG. 5 is a flow chart showing the overall ray tracing process in embodiments of the technology described herein, and that will be performed on and by the graphics processor 2.

First, the geometry of the scene is analysed and used to obtain an acceleration data structure (step 40), for example in the form of a BVH tree structure, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used. Thus, as shown in FIG. 5, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements would, of course, be possible.

This process is performed for each sampling position to be considered in the image plane (frame).

Figure 6:
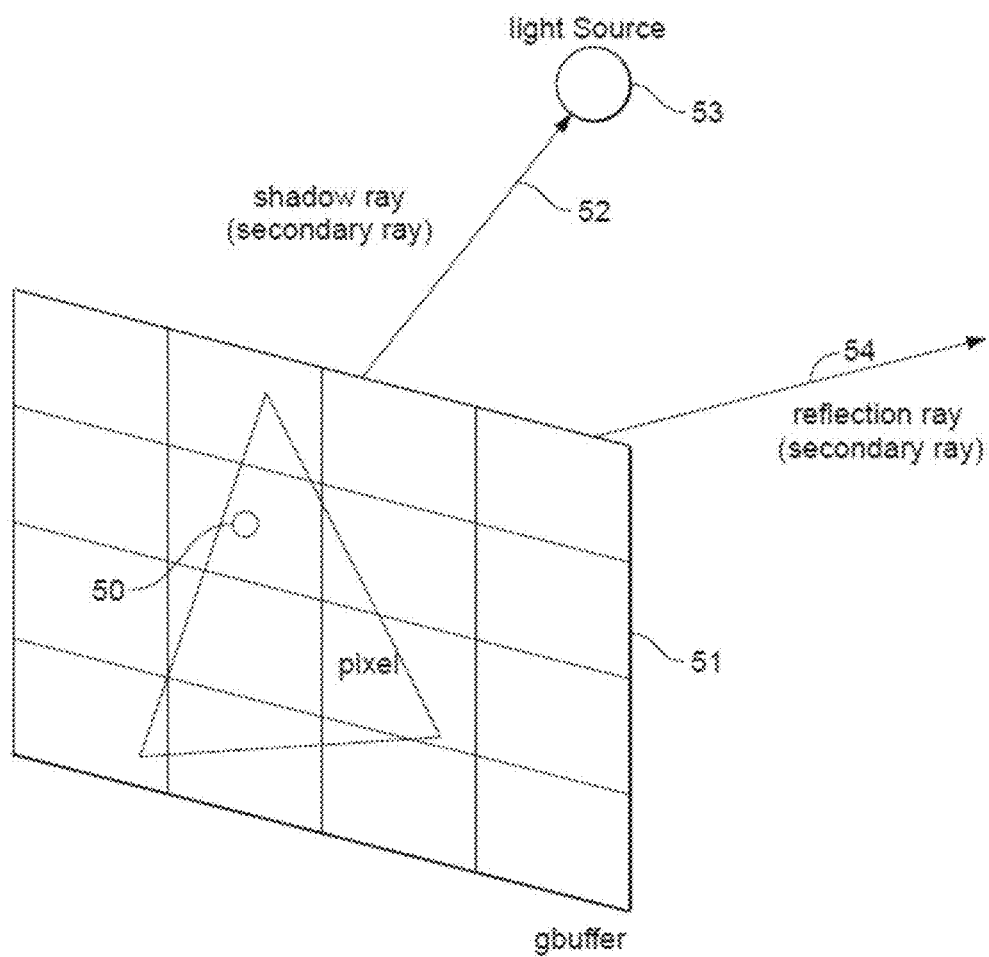
FIG. 6 is a schematic diagram illustrating a "hybrid" ray tracing process.

FIG. 6 shows an alternative ray tracing process which may be used in embodiments of the technology described herein, in which only some of the steps of the full ray tracing process described in relation to FIG. 5 are performed. Such an alternative ray tracing process may be referred to as a "hybrid" ray tracing process.

In this process, as shown in FIG. 6, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 5, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 5. Thus, steps 42, 43 and 44 will be performed in the same manner as previously described in relation to the full ray tracing process for any secondary rays.

The colour determined for a sampling position will be written to the frame buffer in the same manner as step 46 of FIG. 5, based on the shading colour determined for the sampling position based on the first intersection point (as obtained from the G-buffer), and, where applicable, the intersections of any secondary rays with objects in the scene, determined using ray tracing.

The present embodiments relate in particular to the operation of a graphics processor when performing ray tracing-based rendering, e.g. as described above, and in particular to the ray tracing acceleration data structure traversal and geometry intersection (steps 42-43 in FIG. 5) performed as part of the ray tracing operation.

Figure 7:
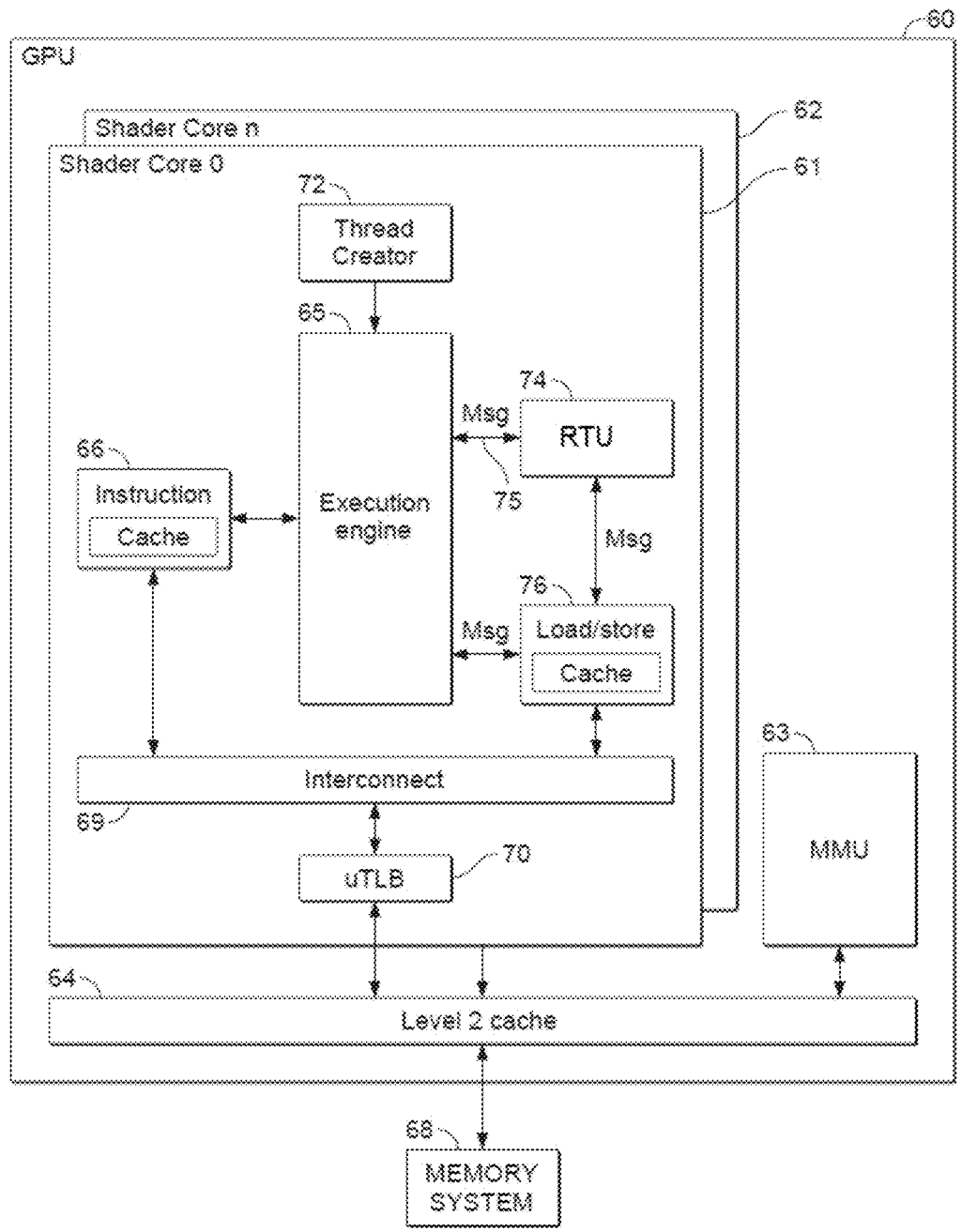
FIG. 7 shows schematically an embodiment of a graphics processor that can be operated in the manner of the technology described herein.

FIG. 7 shows schematically the relevant elements and components of a graphics processor (GPU) 60 of the present embodiments.

As shown in FIG. 7, the GPU 60 includes one or more shader (processing) cores 61, 62 together with a memory management unit 63 and a level 2 cache 64 which is operable to communicate with an off-chip memory system 68 (e.g. via an appropriate interconnect and (dynamic) memory controller).

FIG. 7 shows schematically the relevant configuration of one shader core 61, but as will be appreciated by those skilled in the art, any further shader cores of the graphics processor 60 will be configured in a corresponding manner.

(The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, a ray, etc. The shader cores will process each "item" by means of one or more execution threads which will execute the instructions of the shader program(s) in question for the "item" in question. Typically, there will be multiple execution threads each executing at the same time (in parallel).)

FIG. 7 shows the main elements of the graphics processor 60 that are relevant to the operation of the present embodiments. As will be appreciated by those skilled in the art there may be other elements of the graphics processor 60 that are not illustrated in FIG. 7. It should also be noted here that FIG. 7 is only schematic, and that, for example, in practice the shown functional units may share significant hardware circuits, even though they are shown schematically as separate units in FIG. 7. It will also be appreciated that each of the elements and units, etc., of the graphics processor as shown in FIG. 7 may, unless otherwise indicated, be implemented as desired and will accordingly comprise, e.g., appropriate circuits (processing logic), etc., for performing the necessary operation and functions.

As shown in FIG. 7, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 7, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered).

Accordingly, as shown in FIG. 7, the shader core 61 further comprises a thread creator (generator) 72 operable to generate execution threads for execution by the programmable execution unit 65.

As shown in FIG. 7, the shader core 61 also includes a ray tracing circuit (unit) ("RTU") 74, which is in communication with the programmable execution unit 65, and which is operable to perform the required geometry intersection determinations for rays being processed as part of a ray tracing-based rendering process (i.e. the operations of steps 42 and 43 of FIG. 4 of traversing the acceleration data structure to determine with reference to the node volumes of the acceleration data structure geometry that is potentially intersected by the ray and the corresponding ray-primitive testing to determine which geometry, if any, is actually intersected by the ray), in response to messages 75 received from the programmable execution unit 65.

The RTU 74 is also able to communicate with the load/store unit 76 for loading in the required data for such intersection testing, such as the node data defining the nodes to be tested (e.g. which node data may include data identifying a set of primitives, but could also identify a BLAS to be traversed, as well as any transform that is to be applied, for example).

In the present embodiments, the RTU 74 of the graphics processor is a (substantially) fixed-function hardware unit (circuit) that is configured to perform the required operations to determine geometry for a scene to be rendered that may be (and is) intersected by a ray being used for a ray tracing operation. However, some amount of configurability may be provided.

Figure 8:
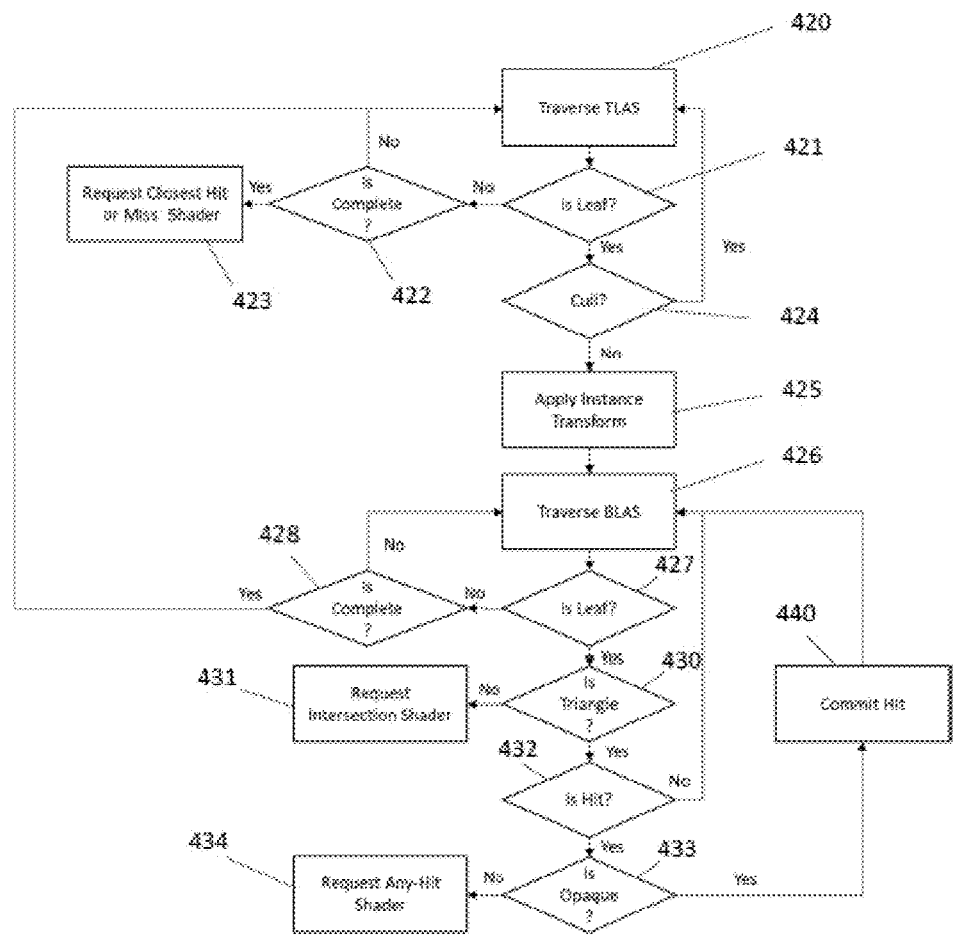
FIG. 8 is a flow chart illustrating the ray tracing operations that can be performed by a ray tracing unit ("RTU") of a graphics processor according to an embodiment of the technology described herein in response to the graphics processor programmable execution unit messaging the RTU to determine the geometry, if any, that is intersected by a particular ray.

FIG. 8 is a flow chart showing the operation of the RTU 74 according to the present embodiments in response to receiving a message from the programmable execution unit 65 to determine, for a group of rays for which a program to perform ray tracing is being executed by a respective thread group (warp) within the programmable execution unit, the geometry, if any, that is intersected by the rays in question.

FIG. 8 in particular shows in more detail the traversal operations that are performed by the RTU for a two-level arrangement of acceleration structures, e.g. as described above with reference to FIG. 4. As shown in FIG. 8, in this case, acceleration structure traversal begins with TLAS traversal (step 420), and TLAS traversal continues in search of a TLAS leaf node (steps 421, 422).

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate ("object") space for BLAS traversal (step 425). BLAS traversal then begins (step 426), and continues in search of a BLAS leaf node (steps 427, 428). If no BLAS leaf node can be identified, the process may return to TLAS traversal (step 420) until all of the nodes have been tested, as necessary, and the traversal operation is completed.

In the present embodiments, geometry associated with a BLAS leaf node can be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430). As shown in FIG. 8, when an axis aligned bounding box (AABB) primitive is encountered, execution of a shader program ("intersection" shader) that defines a procedural object encompassed by the axis aligned bounding box (AABB) is triggered (step 431) to determine whether a ray intersects the procedural object defined by the shader program.

On the other hand, when a set of triangle primitives is encountered, determining whether a ray intersects any of the triangle primitives is performed by the RTU (step 432), as shown in FIG. 8. Thus, if no (valid) triangle primitives which the ray intersects can be identified in the node, the process returns to BLAS traversal (step 426). If a ray is found to intersect a triangle primitive, it is determined whether or not the triangle primitive is opaque (step 433). In the case of the triangle primitive being found to be non-opaque, execution of an appropriate shader program ("any-hit" shader) may be triggered (step 434). Otherwise, in the case of the triangle primitive being found to be opaque, the intersection can be committed without executing a shader program (step 440), and the BLAS traversal continued accordingly (step 426).

The traversal thus proceeds in this way, determining which nodes, if any, are intersected by the ray for which the traversal is being performed.

If no TLAS leaf node can be identified that is intersected by the ray, it is determined that there is an intersection miss, and in that case, a "default" shading operation ("miss" shader) may be performed (step 423), e.g. as described above. If the ray does intersect some geometry, so long as the geometry is an opaque triangle (i.e. step 433—yes), the geometry can be automatically committed, e.g., and in embodiments, added to a record of the intersected geometry. Once the traversal is completed (step 422), the appropriate "closest-hit" shader can then be invoked accordingly (step 423) for further processing of the ray. For instance, depending on the geometry that is intersected, rendering (shading) of the sampling position and/or traversal for one or more secondary rays may be triggered, as appropriate, e.g. as discussed above.

On the other hand, as shown in FIG. 8, if the ray is determined to intersect more complex (non-triangle) primitives such as an axis aligned bounding box (AABB) primitive (at step 430), the RTU in the present embodiments is not able to automatically commit that hit, and the traversal is instead stopped at this point such that the ray can be returned to the programmable execution unit to execute the required "intersection" shader (as determined by the RTU at step 431).

Likewise, if the ray is determined to intersect a non-opaque triangle (step 433—no), the RTU in the present embodiments again cannot automatically commit that hit, as it is required to first execute an appropriate "any-hit" shader (as determined by the RTU at step 434) in order to determine whether or not the hit should be committed. Thus, again, in this situation, the traversal is stopped at this point such that the ray can be returned to the programmable execution unit to execute the required "any-hit" shader.

In both these cases, the traversal is therefore stopped in order to return the processing of the ray to the programmable execution unit to execute the required shader program routine. Once the required shader has been executed, however, the ray should then be (and is) returned to the RTU in order to complete it's traversal.

In the present embodiments, in that case, when the processing of a ray is returned by the RTU to the programmable execution unit before the RTU has completed its processing of the ray, such that the ray should then be (and is) subsequently returned to the RTU to complete its traversal, the traversal is started again, from the beginning (i.e. from the root node of the TLAS). This then saves having to write out the current state of the traversal operation (e.g. the traversal stack) in its entirety which can take up significant memory resource (although this could of course be done in other possible implementations).

As will be described further in relation to FIG. 15 below, the RTU 74 in the present embodiments does however write out at this point an updated set of ray parameters as well as an indication of the progress of the ray's traversal, in particular in the form of an "instance identifier" identifying which object instance (i.e. which BLAS structure) was being traversed when the traversal was stopped and which primitive within a set of primitives represented by the end node of the BLAS was found to be intersected. This information can then be used to accelerate the resumed processing of the ray as shown in FIGS. 9 and 10.

Figure 9:
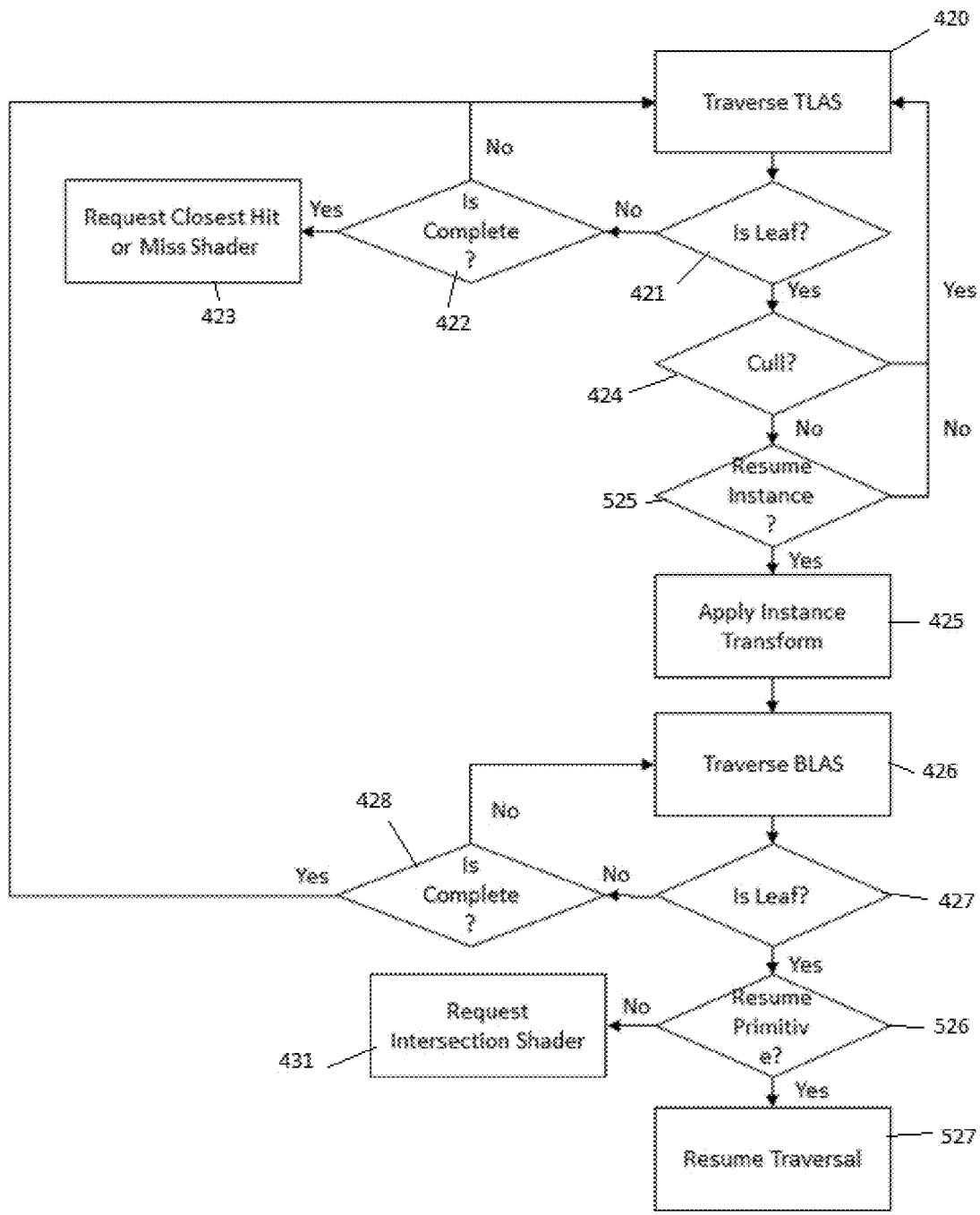
FIG. 9 is a flow chart illustrating the ray tracing operations that can be performed by the RTU when the processing of a ray by the RTU is to be resumed after the RTU has had to stop processing a ray before the ray has completed its traversal of the ray tracing acceleration data structure or structures that are to be traversed in order to return the processing of the ray to the programmable execution unit for execution of an "any-hit" or "intersection" shader.

Thus, as shown in FIG. 9, when the traversal for a ray is resumed, the traversal proceeds as described above in relation to FIG. 8, except that after testing whether the TLAS leaf node can be culled (at step 424), it is then further checked whether the "instance identifier" associated with the TLAS leaf node matches the "instance identifier" that was written out when the traversal was stopped (at step 525) and only if there is a match is the BLAS traversal then triggered (step 525—yes). Similarly, the BLAS traversal generally proceeds as described above in relation to FIG. 8 except that when a leaf node intersection is found, the primitive index is checked to determine from which primitive the traversal should be resumed (at step 526) and only if there is a match (step 526—yes) is the traversal resumed (step 527). (Otherwise, if the primitive index does not match, this means that this is another primitive associated with the same leaf node and that will therefore need an "intersection" shader to be executed, and this is therefore done (step 431).)

In this way, the resumed operation can be accelerated by only testing those nodes that are indicated as needing to be tested and ignoring all TLAS instances until an instance is found that matches the "instance identifier" included in the resume message and likewise ignoring all BLAS primitives until the traversal finds the primitive at which the traversal was stopped. It will also be appreciated that the culling (at step 424) can also be accelerated since the ray parameters may be updated during the traversal which may allow more of the TLAS to be culled when the traversal is subsequently resumed.

Figure 10:
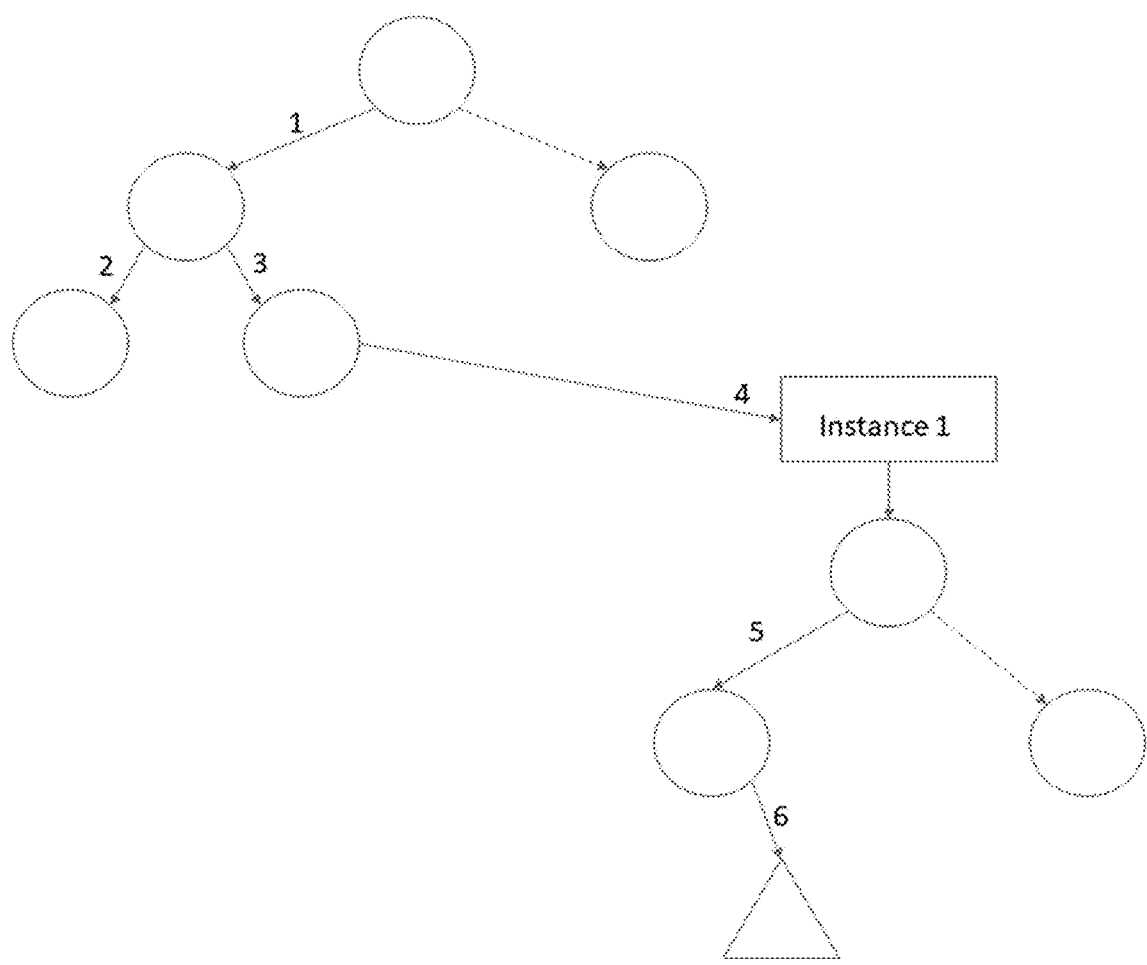
FIG. 10 shows how the processing of the ray may be accelerated when the processing of the ray is to be resumed according to the ray tracing operations according to the flow chart in FIG. 9.

FIG. 10 thus shows schematically the effect of this wherein when the traversal is resumed, the traversal only needs to test a subset of the nodes in order to return to the primitive at which the traversal was stopped.

In the present embodiments, the ray tracing operation is thus initially performed by the programmable execution unit 65 executing a program to perform ray tracing. In this respect, the programmable execution unit 65 typically executes the program for a plurality of rays at the same time, e.g. in lockstep, with the individual rays being processed by respective execution threads in an execution thread group. The program to perform ray tracing includes 'ray tracing' instructions that trigger the RTU 74 operation. Thus, programmable execution unit 65 when executing a program to perform ray tracing, in response to a group of execution threads executing such 'ray tracing' instructions, is operable to send a message to the RTU 74 to trigger the RTU's processing of the rays, e.g. in the manner described above.

The 'ray tracing' instruction, when executed, thus traces a group of rays (up to a warp's worth of rays) through one or more acceleration data structures in order to determine the geometry, if any, that is intersected by the rays in the group. Once the RTU 74 is triggered, the rays are then processed independently of one another within the RTU 74, with the respective traversals being performed and managed until one of the following conditions is met: (i) it is determined that the ray doesn't intersect anything (there is a "miss"); (ii) the intersected primitive closest to the ray origin is found (the 'closest-hit' geometry); (iii) a no-opaque triangle is found (in which case an "any-hit" shader is required to be executed); or (iv) an AABB primitive is intersected (in which case an "intersection" shader is required to be executed). Depending on the result, the RTU 74 should then, and does, return the ray to the programmable execution unit 65 to execute the required shader program routine for further processing the ray.

Thus, it will be appreciated that the operation of the RTU 74 in the present embodiments is typically triggered for groups of one or more rays together (e.g. for which a corresponding execution thread group (warp) was executing the program to perform ray tracing). The RTU 74 then performs and manages the traversal for the different rays individually. However, the RTU 74 is also configured to, and operable to, return groups of rays to the programmable execution unit 65 for execution by a respective execution thread group (warp).

In this respect, the RTU 74 could attempt to preserve the original group of rays. However, there is no need to do this, and the RTU 74 in the present embodiments is also configured to, and operable to, return arbitrary groups of rays. The RTU 74 can therefore attempt to group rays based on one or more heuristics in order to provide a more optimised continued processing of the rays.

Figure 11:
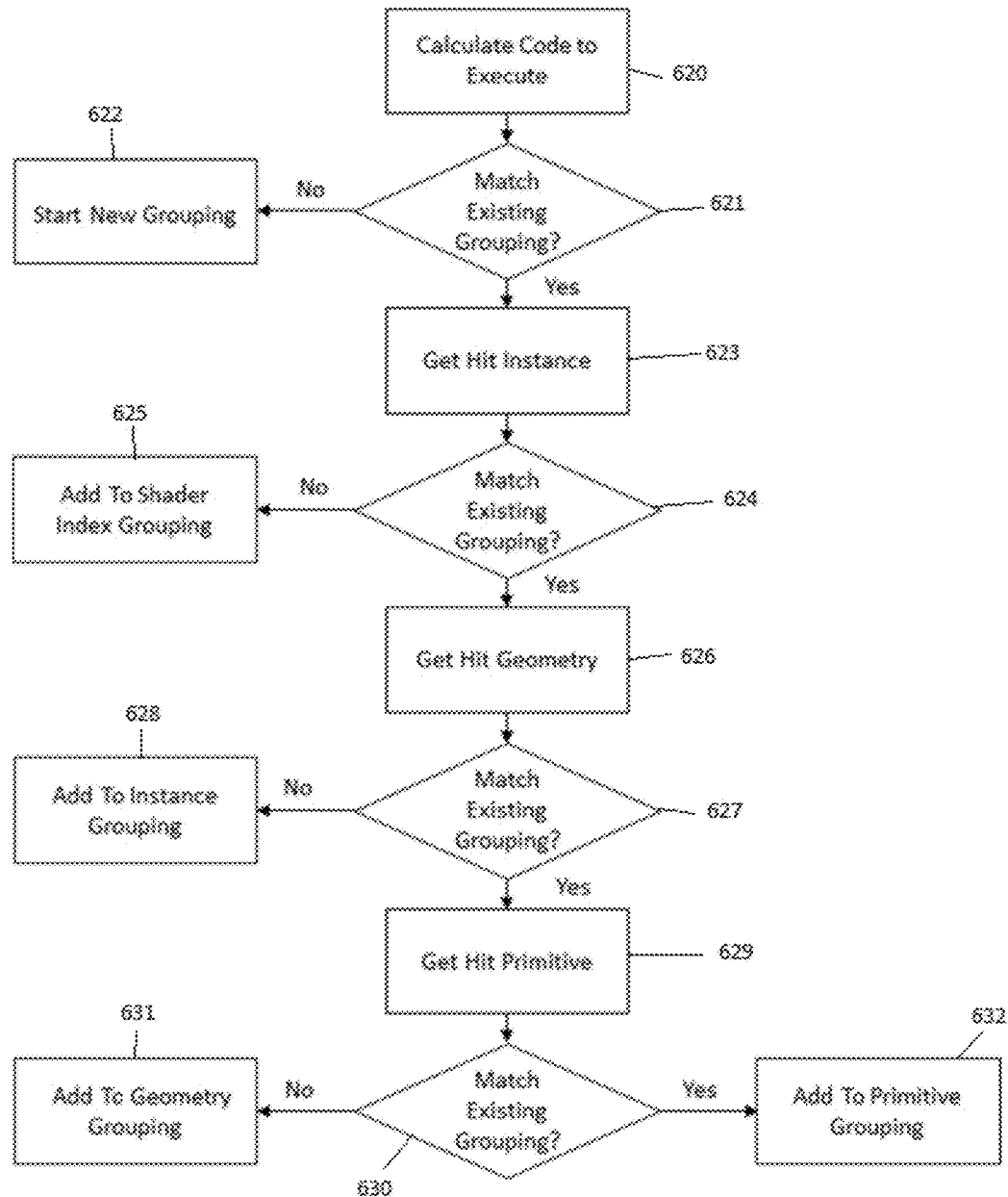
FIG. 11 is a flow chart illustrating how the RTU may select groups of plural rays to be returned to the programmable execution unit together for further processing by a respective execution thread group.
Figure 12:
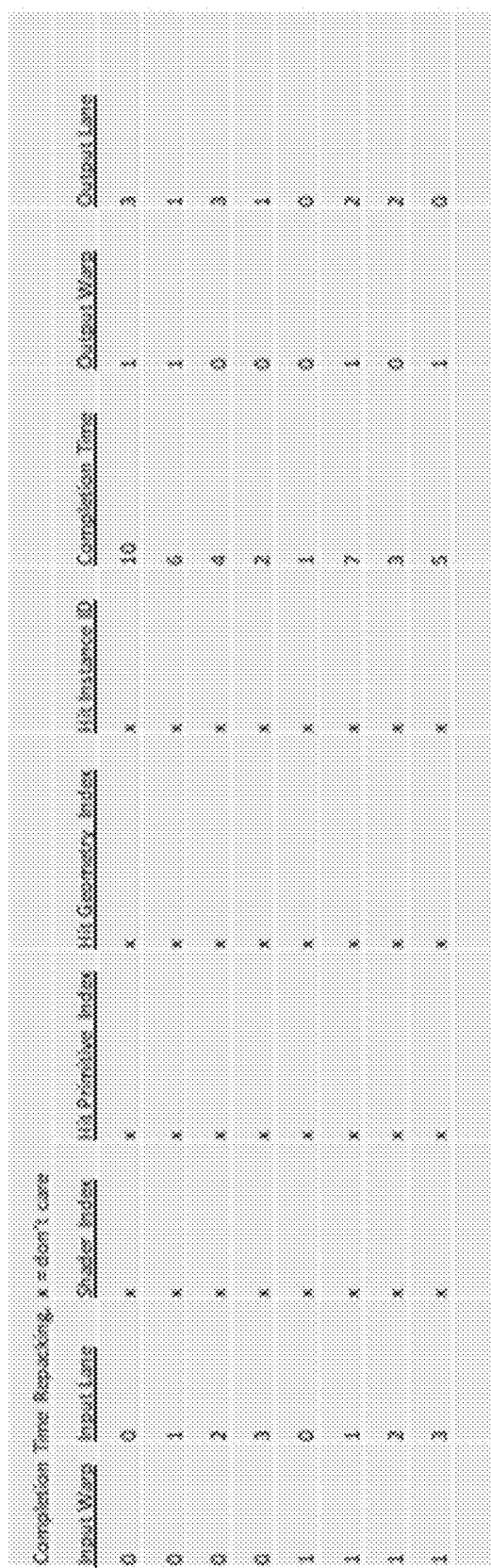
FIG. 12 shows one example of how the RTU may group rays to be returned to the programmable execution unit together for further processing by a respective execution thread group.
Figure 13:
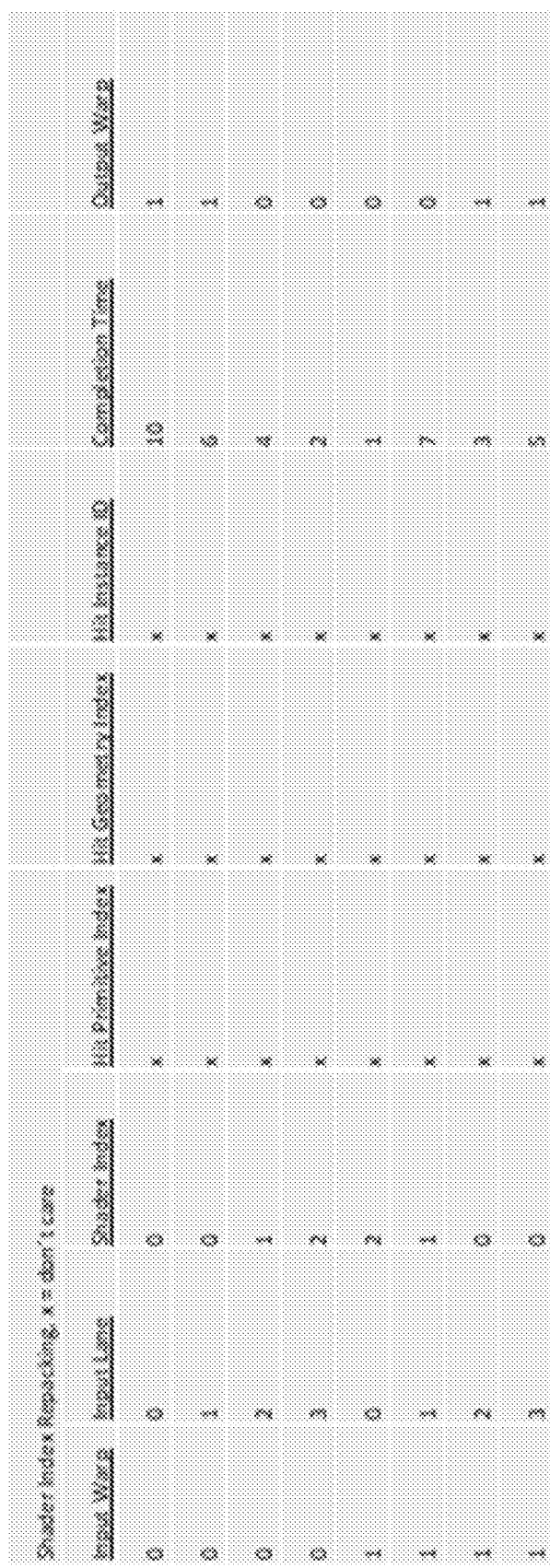
FIG. 13 shows another example of how the RTU may group rays to be returned to the programmable execution unit together for further processing by a respective execution thread group.
Figure 14:
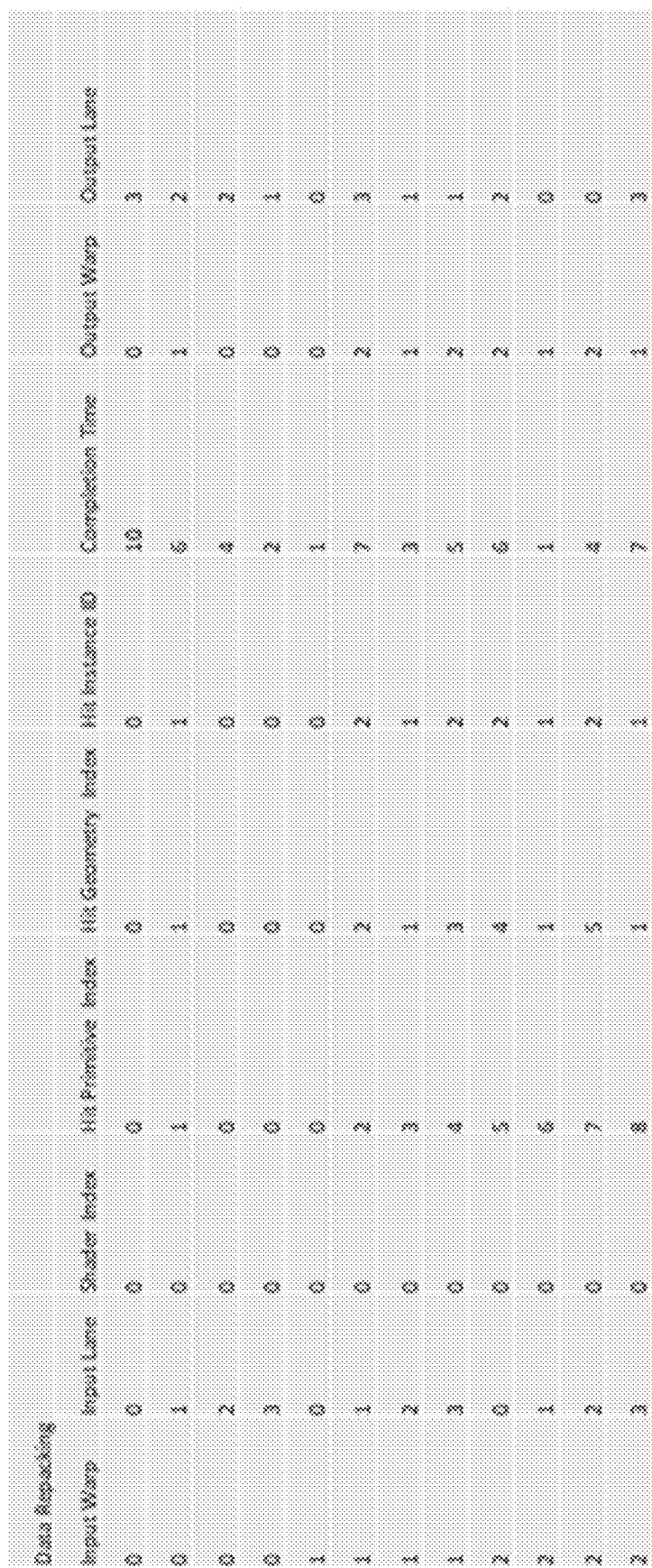
FIG. 14 shows yet another of how the RTU may group rays to be returned to the programmable execution unit together for further processing by a respective execution thread group.

FIG. 11 is a flow chart illustrating how this may be done. FIGS. 12, 13 and 14 illustrate three examples of groupings that may be used.

As shown in FIG. 11, the RTU 74 may be configured to, and operable to, dynamically group rays that are being processed by the RTU 74 according to a number of different heuristics that attempt to optimise the continued ray tracing operation.

Thus, as shown in FIG. 11, once the RTU 74 determines that the processing of a ray should be stopped, either because the traversal is completed, or because the traversal needs to be stopped to return the ray to the programmable execution unit 65, the RTU 74 then calculates the index of the shader program routine that should be executed for the ray in question (step 620).

It is then checked (at step 621) whether the calculated shader index matches the shader index for an existing grouping. If not, the RTU 74 starts a new grouping for that 'shader index' (at step 622), and the grouping process is stopped for that ray.

If the shader index does match an existing grouping (step 621—yes), the hit instance is then obtained (step 623), and it is checked whether the hit instance matches an existing grouping (step 624). If not, the ray is then added to the appropriate 'shader index' grouping (step 625), and the grouping process is stopped for that ray.

On the other hand, if the hit instance also matches an existing grouping (step 624—yes), the hit geometry index is then obtained (at step 626), and it is checked whether the hit geometry index matches an existing grouping (step 627). If not, the ray is then added to the appropriate 'instance' grouping (step 628), and the grouping process is stopped for that ray.

If the hit geometry index matches an existing grouping (step 627—yes), the hit primitive index is then obtained (at step 629), and it is checked whether the hit primitive index matches an existing grouping (step 630). If not, the ray is then added to the appropriate 'geometry' grouping (step 631), and the grouping process is stopped for that ray. Otherwise, if the hit primitive index also matches an existing grouping (step 630—yes), the ray added to the appropriate 'primitive' grouping (at step 632).

Thus, in grouping process illustrated in FIG. 11, the RTU 74 at least attempts to group rays on the basis of code coherency, but is also operable to refine the groupings on the basis of spatial locality, such that rays within the same instance, that intersect the same geometry-containing end node, and that intersect the same primitives, can be (and are) further grouped.

Other arrangements would of course be possible and in general the RTU 74 may group rays according to any suitable and desired heuristics, given various weighting to the different heuristics as desired.

For instance, FIG. 12 shows an example in which rays are grouped based on their completion time. In this example, the shader index and hit properties (the hit primitive, geometry and index identifiers) are thus ignored, and the grouping is made solely based on completion time, in particular such that the first four rays to complete are returned together for execution as a first output warp (output warp 0), whereas the next for rays to complete are returned together for execution as a second output warp (output warp 1) (note in this example the warp size is 4).

FIG. 13 then shows another example in which rays are grouped on the basis of code coherency, in particular such that the RTU 74 attempts to group together into a single output warp rays that require the same shader program routine to be executed. In this example, four of the rays require the same shader program routine to be executed (with shader index 0) and these are therefore grouped together in the same output warp (output warp 1).

FIG. 14 shows another example in which rays are grouped on the basis of data locality, in particular such that the RTU 74 attempts to group together into a single output warp rays that intersect similar geometry. In this example, the grouping is thus in an embodiment performed as illustrated in FIG. 11 in which the RTU 74 attempts to preferentially group together rays that intersect the same primitive, and then rays that intersect the same geometry, and the same instance.

It can be seen in each of these examples that the rays are thus re-grouped such that the rays within the output warps do not match the rays within the input warps. In each case, instead, the groupings are performed to try to optimise the continued execution of the ray tracing program, whether than be in terms of code coherency and/or data locality, or simply in terms of completion time to ensure continued throughput.

Various other arrangements would be possible in this regard.

It will be appreciated from the above that the RTU 74 and programmable execution unit 65 are thus configured to, and operable to, message each other in order to control the overall ray tracing operation, with the messages that are passed between the RTU 74 and programmable execution unit 65 passing the required information for controlling the processing between the two units.

In the present embodiments, the control of the ray tracing operation is therefore performed by the programmable execution unit 65 and the RTU 74 exchanging messages with each other, with the messages triggering the respective operations to be performed (as described above) and also passing the required information between the two units.

The messaging protocol and control described above is in embodiments controlled by the introduction of 'ray tracing' instructions that when executed by the programmable execution unit 65 cause the programmable execution unit 65 to send a message to the RTU 74 to perform geometry determination.

The execution of a 'ray tracing' instruction by the programmable execution unit 65 thus triggers the programmable execution unit 65 to send a message to the RTU 74 to trigger the RTU 74 to perform a traversal. As described above in relation to FIG. 8 and FIG. 9, depending on the result of the traversal, the RTU 74 may then be caused to pass rays back to the programmable execution unit 65 for further processing, with the message that is sent by the RTU 74 to the programmable execution unit 65 in that case indicating the shader index for the shader program routine (or routines) to be executed for further processing the rays.

The 'ray tracing' instruction when executed by the programmable execution unit 65 thus passes a pointer to a certain 'ray data' data structure 700 to the RTU 74. If the ray tracing program wishes to start tracing a new ray, then the parameters to create that ray in the RTU 74 are also passed to the RTU 74 at this point. On the other hand, if the ray tracing program wishes to resume tracing an existing ray, then the RTU 74 can read that ray from memory.

The RTU 74 will then trace the ray until a hit or miss is found and its associated shaders must be executed. As discussed above, this might be because the traversal has completed and the closest-hit primitive has been found, or it has been determined that there is an intersection miss, but could also be because the traversal has stopped in response to the RTU 74 determining that the ray has hit a non-opaque or AABB primitive that needs further processing before the traversal can continue.

In all cases, before returning a ray to the programmable execution unit 65 for further processing, the RTU 74 will write the 'ray data' data structure 700 that it was passed a pointer to and ensure these writes have completed before returning the ray to the execution engine.

Figure 15:
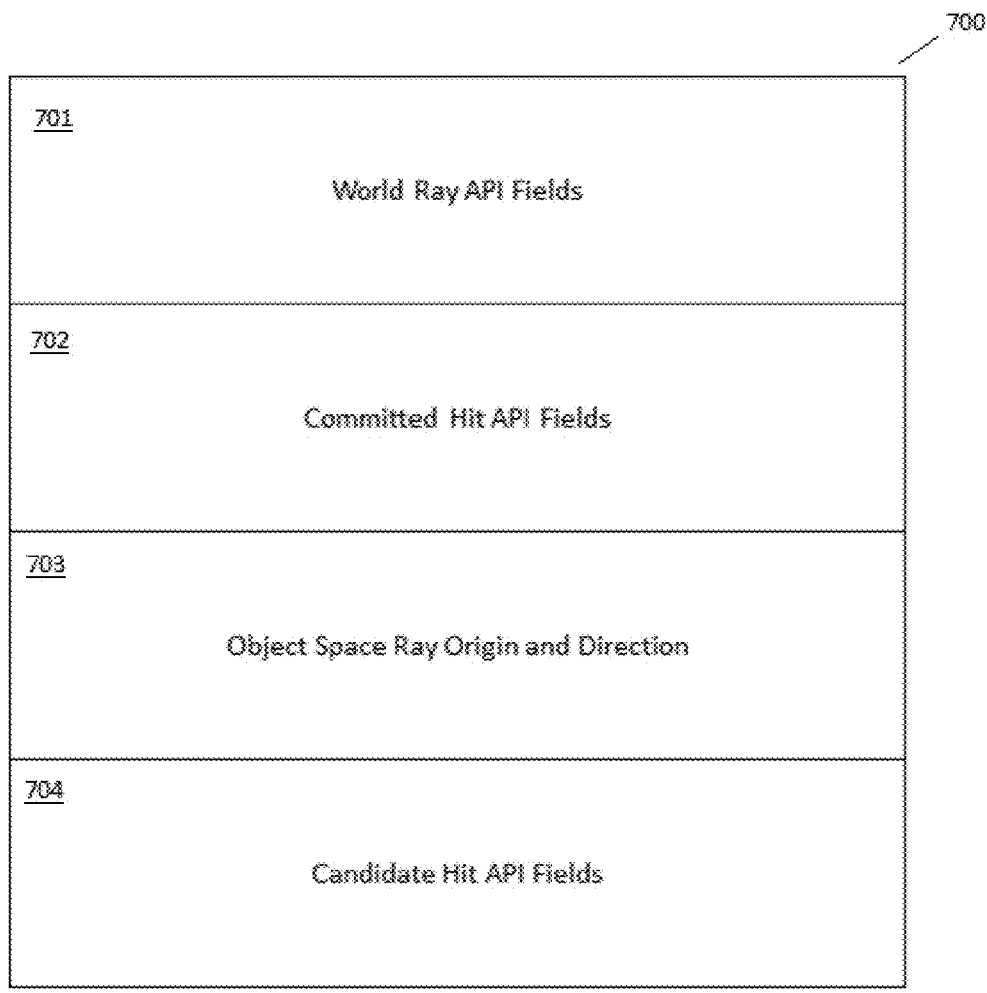
FIG. 15 shows schematically the format of the messages that are passed between the RTU and the programmable execution unit according to embodiments of the technology described herein.

FIG. 15 shows schematically the 'ray data' data structure 700 according to the present embodiments. As shown in FIG. 15, the 'ray data' data structure 700 generally comprises a number of different fields as will be described below for storing information relating to the traversal that may need to be passed between the programmable execution unit 65 and the RTU 74 when performing the operations described above.

For example, the 'ray data' data structure 700 in the present embodiments includes a first set of fields for storing information relating to the parameters defining the ray that is to be processed in the world space co-ordinate system ('World Ray API Fields' 701). These fields may include, for example:
 the x, y, z components of the world space ray origin;
 the x, y, z components of the world space ray direction;
 the world space minimum and/or maximum ray distances;
 one or more ray flags for controlling the ray's traversal;
 a cull mask for the ray;
 a ray offset indicating the ray's hit group offset;
 a ray stride indicating the ray's hit group stride; and
 a "miss" index identifying the "miss" shader program routine within the shader binding table that should be executed or the ray in response to the RTU 74 determining that nothing is intersected by the ray.

The ray parameters can thus be passed from the programmable execution unit 65 to the RTU 74 in order to allow the RTU 74 to create the rays that are to be processed.

The 'ray data' data structure 700 also includes a second set of fields for storing information relating to any committed hits for the ray ('Committed Hit API Fields' 702). These fields may include, for example:
 the ray's committed hit distance;
 the ray's committed hit barycentric u,v components;
 the index of the primitive within a set of primitives represented by a given end node that was hit;
 the index of the data structure containing the set of primitives represented by the end node that was hit;
 the index of the instance (BLAS) for the committed hit primitive;
 an indication of whether the front face of the primitive was hit;
 an indication of whether the primitive is opaque;
 an indication of the committed hit 'type';
 the geometry index (i.e. the 'class' of geometry) for the committed hit primitive; and
 the instance shader binding table offset for the committed hit primitive.

The 'ray data' data structure 700 also includes a third set of fields for storing information relating to the parameters defining the ray to be processed in an object space co-ordinate system, including the object space ray origin x, y, z co-ordinates and z, y, z ray direction ('Object Space Ray Origin and Direction' 703).

In this respect it will be appreciated that when a ray intersects a leaf of a TLAS, the traversal should then proceed to traverse the associated BLAS. To do this, the RTU 74 should thus load in a suitable data structure defining the object instance represented by the BLAS, which data structure will contain a pointer to the relevant BLAS, as well as an appropriate transform matrix for transforming the ray from the world space to the object space represented by the BLAS (e.g. as described above in relation to FIG. 8). The RTU 74 then applies the transform to calculate the object space ray co-ordinates. In this respect, it is beneficial for the RTU 74 to be able to write these to the 'ray data' data structure 700 such that the transformed ray co-ordinates are then available for use by the programmable execution unit 65 rather than having the programmable execution unit 65 re-calculating them (both to save effort and to avoid the risk of the programmable execution unit 65 calculating different results due to the programmable execution unit 65 performing the calculations at a different (higher) precision).

The 'ray data' data structure 700 also includes a fourth set of fields for storing information relating to any candidate hits for the ray ('Candidate Hit API Fields' 704). That is, in response to the RTU 74 determining that the ray potentially intersects or intersects geometry for which an "intersection" or "any-hit" shader is required to be executed, the geometry cannot be automatically committed, and instead the candidate hit must be passed back to the programmable execution unit for further processing to determine whether the hit should be committed. These fields may include, for example:
 the ray's candidate hit distance;
 the ray's candidate hit barycentric u, v components;
 the index of the primitive within a set of primitives represented by a given end node that was hit;
 the index of the data structure containing the set of primitives represented by the end node that was hit;
 the index of the instance (BLAS) for the candidate hit primitive;
 an indication of whether the front face of the primitive was hit;
 an indication of whether the primitive is opaque;
 an indication of the candidate hit 'type';
 the geometry index (i.e. the 'class' of geometry) for the candidate hit primitive;
 the instance shader binding table offset for the candidate hit primitive; and
 a bit map of primitives in the set of primitives represented by the end node that was hit that still require testing when the traversal is resumed.

As mentioned above, when the 'ray tracing' instruction is executed, a pointer to the 'ray data' data structure 700 shown in FIG. 15 is then passed to the RTU 74 for processing. However, in this respect, it will be appreciated that the input registers for this instruction can be interpreted differently depending on whether the RTU 74 is being messaged to trace a new ray (a 'ray creation' state) or to resume tracing of a ray for which the traversal was previously stopped (a 'ray resume' state).

The 'ray tracing' instruction thus in an embodiment also indicates to the RTU 74 as part of the message that is sent whether the ray is a new ray or a ray that is to be resumed.

When in the 'ray creation' state, the RTU 74 should thus (and does) use the World Ray API Fields to create a new ray, and then traverse that ray through the acceleration data structure or structures that are required to be traversed, e.g. as described above in relation to FIG. 8. In this respect it will be appreciated that an indication of the root node of the TLAS to be traversed is also indicated in the message to tell the RTU 74 where to start the traversal operation.

On the other hand, when in the 'ray resume' state, the RTU 74 instead reads in the ray data from memory (since the 'ray data' data structure 700 will have been written to by the RTU 74 when the traversal was stopped). In this case, the RTU 74 should read in the information stored in the 'Candidate Hit API Fields' 704 to allow the resumed traversal to be accelerated (i.e. including the "instance identifier" referred to above in relation to FIG. 9, and used at step 525 thereof, and the primitive and geometry indices used at step 526) e.g. as described above relation to FIG. 9 and FIG. 10.

Thus, when a ray's processing is to be resumed, the input registers include the respective indices identifying the instance, geometry and primitive at which the previous traversal was stopped, as well as the bit map of primitives represented by the end node that require testing on resume. As noted above, when the traversal is resumed it is restarted from the beginning. Thus, the message should also indicate the root node of the TLAS to be traversed to tell the RTU 74 where to start the traversal operation.

In both cases, whether in the 'ray creation' or 'ray resume' state, the traversal then continues until the ray needs to be returned to the programmable execution unit 65 for further processing (for whatever reason that may be). At that point, the RTU 74 writes to the 'ray data' data structure 700 and passes information about the reason that the ray is being returned and the index of the shader program routine that should be executed for further processing of the ray back to the programmable execution 65 via the registers.

The output registers thus include:
The index of the shader program routine in the shader binding table to be executed for the ray; and
The reason the ray was returned.

That is, as mentioned above, the index of the shader program is calculated in the present embodiments by the RTU 74 itself and then returned to the programmable execution unit 65 via the output registers. The calculation of the shader program index is typically specified by the API. For instance, if the ray is being returned because a "miss" shader requires executing then this is calculated by reading the 'miss index' field within the 'ray data' data structure.

On the other hand, if the ray is being returned because a hit shader requires executing then this fields is calculated as below, wherein geometry_id should be chosen for the hit triangle of the RayTriangleData:

$$\text{instance\_sbt\_offset} + \text{geometry\_id} * \text{ray\_stride} + \text{ray\_offset} \quad \text{Equation 1}$$

The RTU 74 also returns the reason the ray was returned. A ray may be returned from the ray trace unit for a number of reasons. The reason describes the type of primitive, triangle or bounding box, that was hit and if the hit was committed. This field summarizes the ray trace units reason for returning and can be used to decide which code to execute next. Normally the return reason will be determined as below. Note that when a ray resumes the ray trace unit will internally update the candidate hit type to 'intersection_none' (see below) but this value will not be stored to memory. It is also possible that the ray trace unit had to return because it was requested to stop or because of a time out.

This field can therefore indicate the following conditions:
there is no intersection to report;
a candidate triangle has been hit;
a candidate bounding box primitive has been hit;
a candidate intersection has been generated from a bounding box primitive;
a triangle has been hit and committed;
a bounding box primitive has been hit and the generated intersection committed.

Thus, once the RTU 74 has performed the necessary traversal or traversals for a ray, and determined geometry that is intersected by the ray, that information is returned to the programmable execution unit 65, for the programmable execution unit to perform further processing for the sampling position in question as a result of, and based on, the result of the determined traversal for the ray, with the further processing being controlled based on the RTU 74 determining and selecting an appropriate shader program routine that should be executed for further processing the ray in question.

For instance, the programmable execution unit 65 may then execute further "surface processing" shader programs that will perform further processing for the sampling position in question based on the result of the ray tracing acceleration data structure traversal for the ray, with the appropriate "surface processing" shader program being determined and selected by the RTU 74.

That is, in the present embodiments, there are plural different sets of further "surface processing" shader programs that can be executed, in dependence upon the type of geometry that has been determined by the ray tracing acceleration data structure traversal circuit as being intersected by a ray (and in particular in dependence upon the particular surface type (surface property or properties) of the geometry determined by the RTU).

Thus the process operates to select the further "processing" shader program to be executed to perform further processing for the sampling position corresponding to a ray in accordance with the type of geometry (and in particular the surface type), that has been determined by the RTU as being intersected by the ray, and the RTU 74 then returns the required shader index via the output registers to the programmable execution unit 65 as described above to trigger the generation of a new group of execution threads.

The programmable execution unit 65 then executes the selected further shader program for the generated thread (e.g. step 45 in FIG. 5).

Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Various other arrangements would be possible.

As will be appreciated from the above, the ray tracing based rendering process of the present embodiments involves, inter alia, the programmable execution unit 65 of the graphics processor 60 executing appropriate shader programs to perform the ray tracing-based rendering. In the present embodiments, these shader programs are generated by a compiler (the shader compiler) 12 for the graphics processor 60, e.g. that is executing on a central processing unit (CPU), such as a host processor, of the graphics processing system (and in an embodiment as part of the driver 11 operation for the graphics processor).

The compiler (driver) will receive the high level ray tracing-based rendering shader program or programs to be executed from the application 13 that requires the ray tracing-based rendering, and then compile that program or programs into appropriate shader programs for execution by the graphics processor, and, as part of this processing, will, as discussed above, include in one or more of the compiled shader programs to be executed by the graphics processor, appropriate 'ray tracing' instructions to cause the programmable execution unit to send a message to the RTU 74 to perform the desired geometry determinations.

The compilation process (the compiler) can use any suitable and desired compiler techniques for this.

Figure 16:
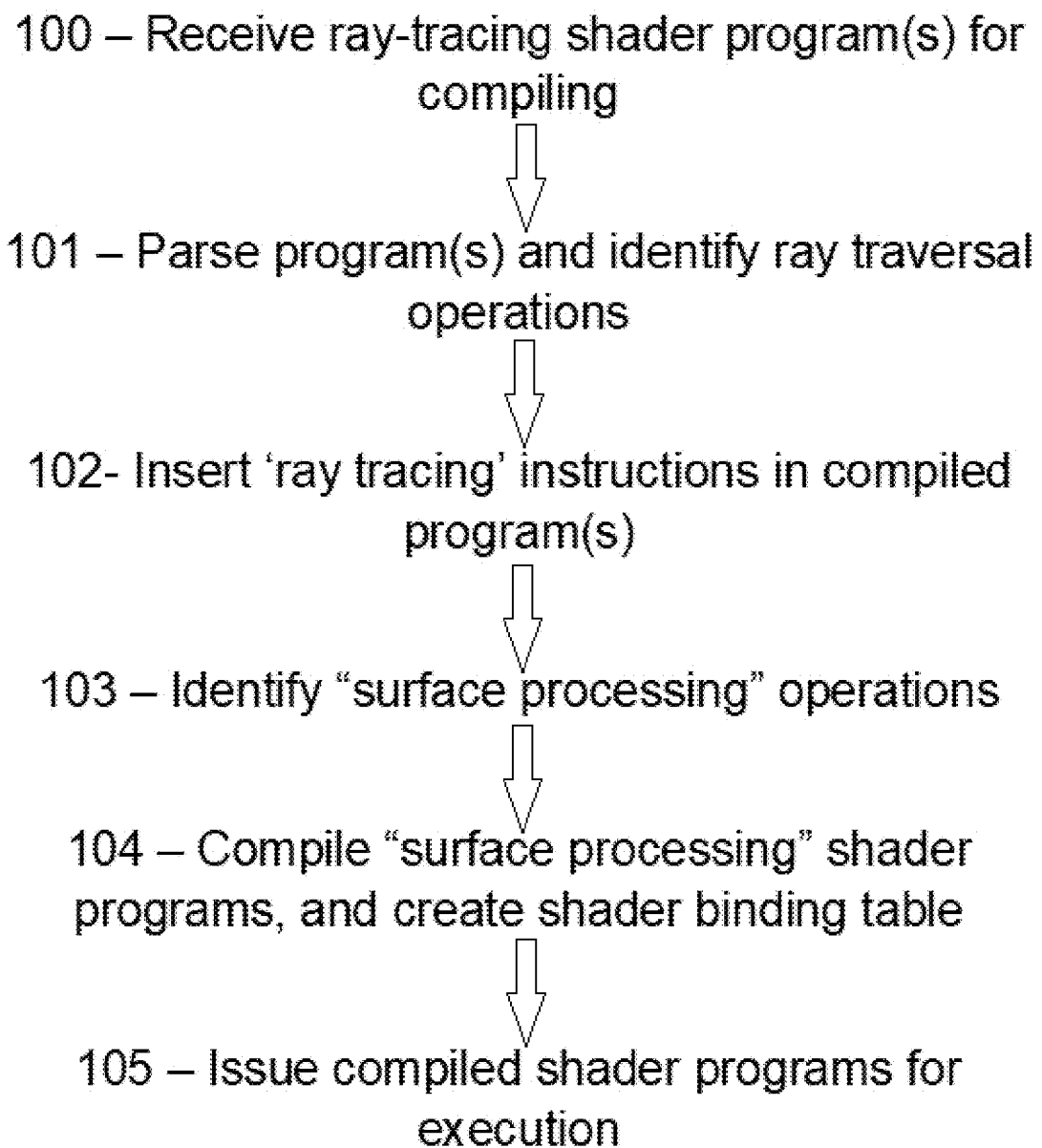
FIG. 16 shows an embodiment of a shader program compilation process according to an embodiment of the technology described herein.

FIG. 16 shows an embodiment of the compilation process.

As shown in FIG. 16, the compiler for the graphics processor will receive a ray tracing-based rendering program or programs for compiling (step 100).

The compiler will then analyse the shader program code that is provided, to identify instances of required traversals of the BVH tree structure during the ray traversal operations in that shader program code (step 101), and to insert corresponding 'ray tracing' instruction(s) at the appropriate point(s) in the compiled shader program(s) (step 102).

The required "surface processing" operations for the intersected geometry can also be identified (step 103) and respective "surface processing" shader programs compiled (step 104). These are indexed appropriately within a respective 'shader binding table'

The compiled shader programs will then be issued to the graphics processor for execution (e.g. stored in appropriate memory of and/or accessible to the graphics processor, so that the graphics processor can fetch the required shader programs for execution as required) (step 105).

It can be seen from the above that the technology described herein, in its embodiments at least, can provide a more efficient process for performing ray tracing-based rendering. This is achieved, in the embodiments of the technology described herein at least, by using a dedicated ray tracing circuit (unit) to perform and manage traversals of a ray tracing acceleration data structure (e.g. a BVH tree structure) for rays being processed, with the ray tracing circuit (unit) in embodiments being operable to determine the geometry, if any, that is intersected by a given ray, and to further determine the index of a corresponding shader program routine that should therefore be executed based on such determination. The ray tracing circuit (unit) can then return the ray, together with the determined shader index to the programmable execution unit such that the further processing of the ray for the ray tracing-based rendering can then be performed by executing an appropriate shader program or programs using a programmable execution unit of the graphics processor.

The invention claimed is:

1. A method of operating a graphics processor to generate a render output by performing a ray tracing process in which plural rays are traced through a scene to be rendered,
   wherein the ray tracing process uses one or more ray tracing acceleration data structures indicative of the distribution of geometry within the scene to be rendered to determine which geometry is intersected by the rays being used for the ray tracing process, and
   wherein the ray tracing process for a ray involves performing a traversal of at least one ray tracing acceleration data structure to determine geometry that is intersected or potentially intersected by the ray, the traversal for a particular ray starting from a respective start point of a first ray tracing acceleration data structure to be traversed for that ray,
   the graphics processor comprising a programmable execution unit operable to execute graphics processing programs, and in which programs can be executed by groups of one or more execution threads,
   the graphics processor also comprising a ray tracing circuit that can be messaged by the programmable execution unit during execution of a program to perform ray tracing to perform, for a ray for which the program was being executed, a respective traversal of the at least one ray tracing acceleration data structure to be traversed for that ray,
   the method comprising:
   for a ray for which the ray tracing circuit is performing a respective traversal:
   when the ray tracing circuit determines with reference to the ray tracing acceleration data structure that is currently being traversed that the ray intersects or potentially intersects geometry that requires a shader program routine to be executed before the traversal can continue:
   the ray tracing circuit stopping the traversal at that point and subsequently returning the processing of the ray to the programmable execution unit for execution of the required shader program routine, such that the ray's processing is returned to the programmable execution unit before the ray's traversal of the at least one ray tracing acceleration data structure to be traversed for that ray is completed;
   the method further comprising:
   the programmable execution unit executing the required shader program routine and subsequently returning the processing of the ray to the ray tracing circuit to restart its traversal of the at least one ray tracing acceleration data structure to be traversed for that ray; and
   the ray tracing circuit then restarting the ray's traversal of the at least one ray tracing acceleration data structure to be traversed for that ray, wherein when the ray tracing circuit restarts the ray's traversal the traversal is performed from the beginning, starting from the respective start point of the first ray tracing acceleration data structure to be traversed for that ray.

2. The method of claim 1, further comprising:
   when the ray tracing circuit returns the processing of a ray to the programmable execution unit to execute a shader program before the ray's traversal of the at least one ray tracing acceleration data structure is completed, storing one or more indicators of the progress of the ray's traversal through the at least one ray tracing acceleration data structure up to the point at which the traversal was stopped; and
   when the processing of the ray is subsequently returned to the ray tracing circuit to restart the ray's traversal of the at least one ray tracing acceleration data structure, the ray tracing circuit using the stored one or more indicators of the progress of the ray's traversal through the at least one ray tracing acceleration data structure up to the point at which the traversal was stopped to accelerate the restarted traversal of the at least one ray tracing acceleration data structure.

3. The method of claim 2, wherein when the ray tracing circuit stops a ray's traversal, before the processing of the ray is returned to the programmable execution unit, the method comprises the ray tracing circuit writing the one or more indicators to memory;
   the method further comprising: when the processing of the ray is subsequently returned to the ray tracing circuit to resume its traversal of the at least one ray tracing acceleration data structure, the ray tracing circuit obtaining the one or more indicators from memory.

4. The method of claim 1, wherein when the ray tracing circuit stops a ray's traversal, before the processing of the ray is returned to the programmable execution unit, the method comprises the ray tracing circuit writing to memory a set of updated parameters defining the ray; the method further comprising: when the ray is subsequently returned to the ray tracing circuit to resume its traversal of the at least one ray tracing acceleration data structure, the ray tracing circuit using the updated parameters defining the ray to attempt to cull some or all of the at least one ray tracing acceleration data structure to be traversed for the ray.

5. The method of claim 1, wherein the ray tracing process uses a two-level arrangement of ray tracing acceleration data structures comprising a first, top level ray tracing acceleration data structure and one or more second, bottom level ray tracing acceleration data structures, wherein the one or more second, bottom level ray tracing acceleration data structures are associated with respective end nodes of the first, top level ray tracing acceleration data structure, and wherein the one or more indicators of the progress of the ray's traversal that are stored when the traversal is restarted include an indication of the second, bottom level ray tracing acceleration data structure that contains the geometry that caused the traversal to be stopped.

6. The method of claim 5, wherein when the traversal is restarted, when the traversal reaches an end node of the first, top level ray tracing acceleration data structure that represents a second, bottom level ray tracing acceleration data structure, using the stored indication to determine whether or not the second, bottom level ray tracing acceleration data structure needs to be traversed, and when it is determined based on the stored indicator that the second, bottom level ray tracing acceleration data structure does not need to be traversed, skipping traversing that second, bottom level ray tracing acceleration data structure.

7. The method of claim 1, the ray tracing acceleration data structure or structures comprising a plurality of nodes, each node associated with a respective volume within the scene, and wherein at least some ends nodes of at least one acceleration data structure represent respective sets of geometry encompassed by the respective volumes associated with the nodes of that acceleration data structure, and wherein the one or more indicators of the progress of the ray's traversal that are stored when the traversal is restarted include an indication of the end node that contains the geometry that caused the traversal to be stopped.

8. The method of claim 7, wherein when the traversal is restarted, when the traversal reaches an end node that represents a respective set of geometry, using the stored indication to determine whether or not the end node needs to be tested, and when it is determined based on the stored indicator that the end node does not need to be tested, skipping testing that end node.

9. The method of claim 7, wherein the one or more indicators further indicate which primitives of a set of plural primitives associated with the end node need to be tested when the traversal is restarted.

10. The method of claim 9, wherein the one or more indicators include a bit mask indicating which primitives of a set of plural primitives associated with the end node need to be tested when the traversal is restarted.

11. A graphics processor that is operable to generate a render output by performing a ray tracing process in which plural rays are traced through a scene to be rendered,
wherein the ray tracing process uses one or more ray tracing acceleration data structures indicative of the distribution of geometry within the scene to be rendered to determine which geometry is intersected by the rays being used for the ray tracing process, and
wherein the ray tracing process for a ray involves performing a traversal of at least one ray tracing acceleration data structure to determine geometry that is intersected or potentially intersected by the ray, the traversal for a particular ray starting from a respective start point of a first ray tracing acceleration data structure to be traversed for that ray,
the graphics processor comprising a programmable execution unit operable to execute graphics processing programs, and in which programs can be executed by groups of one or more execution threads,
the graphics processor also comprising a ray tracing circuit that can be messaged by the programmable execution unit during execution of a program to perform ray tracing to perform, for a ray for which the program was being executed, a respective traversal of the at least one ray tracing acceleration data structure to be traversed for that ray,
the graphics processor being configured such that:
for a ray for which the ray tracing circuit is performing a respective traversal:
when the ray tracing circuit determines with reference to the ray tracing acceleration data structure that is currently being traversed that the ray intersects or potentially intersects geometry that requires a shader program routine to be executed before the traversal can continue:
the ray tracing circuit is configured to stop the traversal at that point and subsequently return the processing of the ray to the programmable execution unit to execute the required shader program routine, such that the ray's processing is returned to the programmable execution unit before the ray's traversal of the at least one ray tracing acceleration data structure to be traversed for that ray is completed;
the programmable execution unit is configured to then execute the required shader program routine and subsequently return the processing of the ray to the ray tracing circuit to restart the ray's traversal of the at least one ray tracing acceleration data structure to be traversed for that ray; and
the ray tracing circuit is configured to then restart the ray's traversal of the at least one ray tracing acceleration data structure to be traversed for that ray, wherein when the ray tracing circuit restarts the ray's traversal the traversal is performed from the beginning, starting from the respective start point of the first ray tracing acceleration data structure to be traversed for that ray.

12. The graphics processor of claim 11, further configured such that:
when the ray tracing circuit returns the processing of a ray to the programmable execution unit to execute a shader program before its traversal of the at least one ray tracing acceleration data structure is completed, the ray tracing circuit stores one or more indicators of the progress of the ray's traversal through the at least one ray tracing acceleration data structure up to the point at which the traversal was stopped; and
when the ray is subsequently returned to the ray tracing circuit to restart its traversal of the at least one ray tracing acceleration data structure, the ray tracing circuit uses the stored one or more indicators of the progress of the ray's traversal through the at least one ray tracing acceleration data structure up to the point at which the traversal was stopped to accelerate the restarted traversal of the at least one ray tracing acceleration data structure.

13. The graphics processor of claim 12, wherein when the ray tracing circuit stops a ray's traversal, before the processing of the ray is returned to the programmable execution unit, the ray tracing circuit writes the one or more indicators to memory;
wherein when the processing of the ray is subsequently returned to the ray tracing circuit to resume its traversal of the at least one ray tracing acceleration data structure, the ray tracing circuit is configured to obtain the one or more indicators from memory.

14. The graphics processor of claim 11, wherein when the ray tracing circuit stops a ray's traversal, before the processing of the ray is returned to the programmable execution unit, the ray tracing circuit writes to memory a set of updated parameters defining the ray; the ray tracing circuit further configured to: when the processing of the ray is subsequently returned to the ray tracing circuit to resume the ray's traversal of the at least one ray tracing acceleration data structure, use the updated parameters defining the ray to attempt to cull some or all of the at least one ray tracing acceleration data structure to be traverse for the ray.

15. The graphics processor of claim 11, wherein the ray tracing process uses a two-level arrangement of ray tracing acceleration data structures comprising a first, top level ray tracing acceleration data structure and one or more second, bottom level ray tracing acceleration data structures, wherein the one or more second, bottom level ray tracing acceleration data structures are associated with respective end nodes of the first, top level ray tracing acceleration data structure, and wherein the one or more indicators of the progress of the ray's traversal that are stored when the traversal is restarted include an indication of the second, bottom level ray tracing acceleration data structure that contains the geometry that caused the traversal to be stopped.

16. The graphics processor of claim 15, wherein when the traversal is restarted, when the traversal reaches an end node of the first, top level ray tracing acceleration data structure that represents a second, bottom level ray tracing acceleration data structure, the ray tracing circuit uses the stored indication to determine whether or not the second, bottom level ray tracing acceleration data structure needs to be traversed, and when it is determined based on the stored indicator that the second, bottom level ray tracing acceleration data structure does not need to be traversed, the ray tracing circuit is configured to skip traversing that second, bottom level ray tracing acceleration data structure.

17. The graphics processor of claim 11, the ray tracing acceleration data structure or structures comprising a plurality of nodes, each node associated with a respective volume within the scene, and wherein at least some ends nodes of at least one acceleration data structure represent respective sets of geometry encompassed by the respective volumes associated with the nodes of that acceleration data structure, and wherein the one or more indicators of the progress of the ray's traversal that are stored when the traversal is restarted include an indication of the end node that contains the geometry that caused the traversal to be stopped.

18. The graphics processor of claim 17, wherein when the traversal is restarted, when the traversal reaches an end node that represents a respective set of geometry, the ray tracing circuit uses the stored indication to determine whether or not the end node needs to be tested, and when it is determined based on the stored indicator that the end node does not need to be tested, the ray tracing circuit is configured to skip testing that end node.

19. The graphics processor of claim 17, wherein the one or more indicators further indicate which primitives of a set of plural primitives associated with the end node need to be tested when the traversal is restarted.

20. A non-transitory computer readable storage medium storing computer software code which when executing on one or more processors performs a method of operating a graphics processor to generate a render output by performing a ray tracing process in which plural rays are traced through a scene to be rendered,
wherein the ray tracing process uses one or more ray tracing acceleration data structures indicative of the distribution of geometry within the scene to be rendered to determine which geometry is intersected by the rays being used for the ray tracing process, and
wherein the ray tracing process for a ray involves performing a traversal of at least one ray tracing acceleration data structure to determine geometry that is intersected or potentially intersected by the ray, the traversal for a particular ray starting from a respective start point of a first ray tracing acceleration data structure to be traversed for that ray,
the graphics processor comprising a programmable execution unit operable to execute graphics processing programs, and in which programs can be executed by groups of one or more execution threads,
the graphics processor also comprising a ray tracing circuit that can be messaged by the programmable execution unit during execution of a program to perform ray tracing to perform, for a ray for which the program was being executed, a respective traversal of the at least one ray tracing acceleration data structure to be traversed for that ray,
the method comprising:
for a ray for which the ray tracing circuit is performing a respective traversal:
when the ray tracing circuit determines with reference to the ray tracing acceleration data structure that is currently being traversed that the ray intersects or potentially intersects geometry that requires a shader program routine to be executed before the traversal can continue:
the ray tracing circuit stopping the traversal at that point and subsequently returning the processing of the ray to the programmable execution unit for execution of the required shader program routine, such that the ray's processing is returned to the programmable execution unit before the ray's traversal of the at least one ray tracing acceleration data structure to be traversed for that ray is completed;
the method further comprising:
the programmable execution unit executing the required shader program routine and subsequently returning the processing of the ray to the ray tracing circuit to restart its traversal of the at least one ray tracing acceleration data structure to be traversed for that ray; and
the ray tracing circuit then restarting the ray's traversal of the at least one ray tracing acceleration data structure to be traversed for that ray, wherein when the ray tracing circuit restarts the ray's traversal the traversal is performed from the beginning, starting from the respective start point of the first ray tracing acceleration data structure to be traversed for that ray.

\* \* \* \* \*